United States Patent
Matsuzawa et al.

(10) Patent No.: US 12,275,371 B2
(45) Date of Patent: Apr. 15, 2025

(54) INFORMATION PROCESSING DEVICE, INFORMATION PROCESSING METHOD, AND INFORMATION PROCESSING SYSTEM FOR PERFORMING CONTINUOUS AUTHENTICATION

(71) Applicant: SONY GROUP CORPORATION, Tokyo (JP)

(72) Inventors: Sota Matsuzawa, Tokyo (JP); Masatomo Kurata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/001,780

(22) PCT Filed: Jun. 10, 2021

(86) PCT No.: PCT/JP2021/022073
§ 371 (c)(1),
(2) Date: Dec. 14, 2022

(87) PCT Pub. No.: WO2021/261267
PCT Pub. Date: Dec. 30, 2021

(65) Prior Publication Data
US 2023/0286463 A1    Sep. 14, 2023

(30) Foreign Application Priority Data
Jun. 26, 2020   (JP) .................. 2020-110828

(51) Int. Cl.
*B60R 25/24*   (2013.01)
*B60R 25/31*   (2013.01)
(Continued)

(52) U.S. Cl.
CPC .............. *B60R 25/24* (2013.01); *B60R 25/31* (2013.01); *G06F 21/32* (2013.01);
(Continued)

(58) Field of Classification Search
CPC ......... B60R 25/24; B60R 25/31; G06F 21/32; H04W 12/065; H04W 12/64; H04W 4/40
See application file for complete search history.

(56) References Cited

U.S. PATENT DOCUMENTS 9,762,581 B1    9/2017  Wang
11,837,030 B2 * 12/2023  Shibata .................. G06V 40/70
(Continued)

FOREIGN PATENT DOCUMENTS

EP         3859662 A1     8/2021
JP      2012234235 A  * 11/2012
(Continued)

OTHER PUBLICATIONS

International Search Report and Written Opinion of PCT Application No. PCT/JP2021/022073, issued on Sep. 7, 2021, 09 pages of ISRWO.

*Primary Examiner* — Curtis A Kuntz
*Assistant Examiner* — James E Munion
(74) *Attorney, Agent, or Firm* — CHIP LAW GROUP

(57) ABSTRACT

An information processing terminal 10 includes: a trigger point recording unit 118 that acquires a trigger point at which gait authentication of a user for unlocking doors is performed, the trigger point passed through before a point at which unlocking the doors is performed on the vehicle 30; a gait authentication unit 140 that performs the gait authentication on a basis of motion information obtained by continuously measuring walking of the user when the trigger point is passed; and an information presentation unit 134 that notifies the user that the gait authentication has failed in a case where the gait authentication has failed.

19 Claims, 16 Drawing Sheets

(51) Int. Cl.
*G06F 21/32* (2013.01)
*H04W 4/40* (2018.01)
*H04W 12/065* (2021.01)
*H04W 12/64* (2021.01)

(52) U.S. Cl.
CPC ......... *H04W 12/065* (2021.01); *H04W 12/64* (2021.01); *H04W 4/40* (2018.02)

(56) References Cited

U.S. PATENT DOCUMENTS

2017/0282856 A1* 10/2017 Riedel ..................... B60R 25/24
2020/0159908 A1* 5/2020 Okuyama ................ G06F 21/45
2020/0198581 A1* 6/2020 Ette ......................... B60R 25/31

FOREIGN PATENT DOCUMENTS

| JP | 2019204494 A | * 11/2019 | ............. G06F 18/00 |
| JP | 2020-086780 A | 6/2020 | |
| WO | 2018/154900 A1 | 8/2018 | |
| WO | 2020/065954 A1 | 4/2020 | |

* cited by examiner

FIG.6

| TIMING | DETECTION METHOD |
|---|---|
| (1)WHEN DOORS ARE LOCKED FROM OUTSIDE | DETECT LOCKING FROM OUTSIDE BY COMBINING LOAD SENSOR OF SEATS AND LOCKING STATE OF DOORS |
| | REGARDED AS LOCKING FROM OUTSIDE WITH USE OF REMOTE KEY |
| (2)WHEN DOOR IS OPENED AND USER GOES OUTSIDE | DETECT ALIGHTING OF DRIVER BY LOAD SENSOR OF SEATS AND OPENING AND CLOSING OF DOORS |
| | DETECT ALIGHTING OF DRIVER BY WALKING DETECTION BY LOAD SENSOR OF SEATS AND ACCELERATION SENSOR OF TERMINAL (SUCH AS SMARTPHONE) CARRIED BY DRIVER |
| | DETECT ALIGHTING OF DRIVER WITH DISCONNECTION OF WIRELESS CONNECTION BETWEEN INFORMATION TERMINAL CARRIED BY DRIVER AND VEHICLE |
| | DETECT ALIGHTING OF DRIVER WITH CHANGE IN ACTION RECOGNITION RESULT, USING MOTION SENSOR OF INFORMATION TERMINAL CARRIED BY DRIVER, FROM ONBOARD STATE TO WALKING STATE |
| (3)WHEN VEHICLE STOPS | DETECT THAT SPEED HAS FALLEN TO ZERO BY SPEED METER |
| (4)WHEN PARKING OF VEHICLE IS COMPLETED | DETECT THAT ENGINE OF VEHICLE IS TURNED OFF |
| | DETECT THAT GEAR IS PLACED IN PARKING |
| | DETECT COMPLETION OF PARKING BY DRIVING ASSIST |
| (5)WHEN AUTONOMOUS DRIVING VEHICLE IS CALLED | IN A CASE WHERE RESERVATION TO CALL AUTONOMOUS DRIVING VEHICLE TO USER'S SCHEDULED BOARDING POSITION IS MADE BY INFORMATION PROCESSING TERMINAL BY DESIGNATING DATE, TIME AND PLACE, TRIGGER POINT (GEOFENCE) IS SET AT POSITION OF CALL DESTINATION AT TIME OF COMPLETION OF RESERVATION |

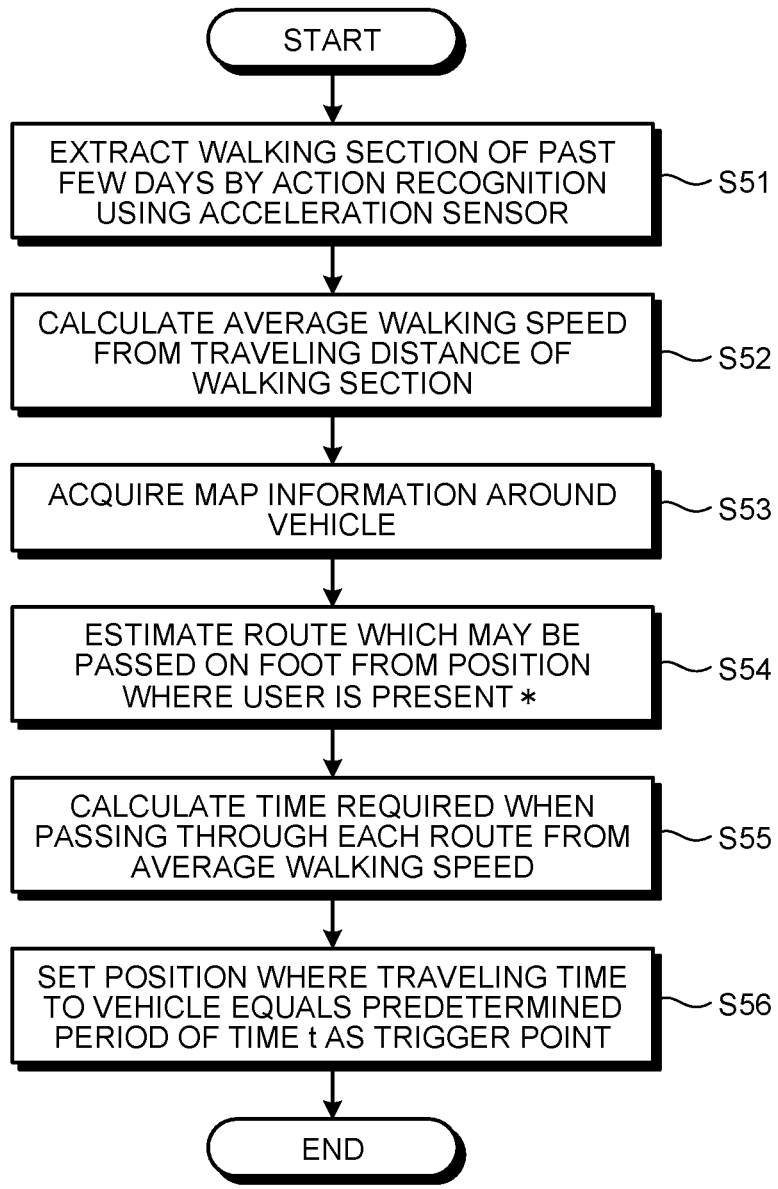

FIG.8

| TYPE OF INFORMATION PROCESSING TERMINAL TO BE NOTIFIED | CHARACTERISTICS | TIME t |
|---|---|---|
| SMARTPHONE IN POCKET | NOTIFICATION CAN BE NOTICED BY SOUND OR VIBRATION | SET TO REFERENCE VALUE |
| SMARTPHONE IN BAG | IT IS MORE DIFFICULT TO NOTICE NOTIFICATION THAN IN A CASE OF BEING IN POCKET. IT IS ALSO NECESSARY TO TAKE OUT TERMINAL FROM BAG AT TIME OF ALTERNATIVE AUTHENTICATION | SET TO VALUE LONGER THAN REFERENCE VALUE |
| WATCH/WRISTBAND-TYPE WEARABLE DEVICE | IT IS EASIER TO NOTICE NOTIFICATION AND TO OPERATE TERMINAL AT TIME OF ALTERNATIVE AUTHENTICATION | SET TO VALUE SHORTER THAN REFERENCE VALUE |
| AR GLASS-TYPE WEARABLE DEVICE | INFORMATION IS LOADED AT SAME TIME AS RECEPTION OF NOTIFICATION, AND THUS VISUAL SENSE AND AUDITORY SENSE ARE PARTIALLY DEPRIVED INSTANTANEOUSLY | SET TO REFERENCE VALUE (ADD AND SET RULE OF NOTIFYING AT TIMING WHEN USER STOPS AFTER PASSING THROUGH TRIGGER POINT) |
| HEARABLE WEARABLE DEVICE | | |

FIG.9

| GEOGRAPHICAL OR WEATHER CONDITION | CHARACTERISTICS | TIME t(TRIGGER POINT) |
|---|---|---|
| (1) PLACE WHERE FLAT STRAIGHT ROAD CONTINUES | GAIT AUTHENTICATION IS MORE LIKELY TO SUCCEED WHEN WALKING LINEARLY | SET TO VALUE SHORTER THAN REFERENCE VALUE |
| (2) PLACE WITH MANY CORNERS AND SHORT STRAIGHT ROADS | GAIT AUTHENTICATION IS LIKELY TO FAIL SINCE WAY OF WALKING CHANGES FROM USUAL AT TIME OF TURNING (TURNING AT CORNER) | SET TO VALUE LONGER THAN REFERENCE VALUE |
| (3) BAD WEATHER (SNOW OR RAIN) | GAIT AUTHENTICATION IS LIKELY TO FAIL SINCE WAY OF WALKING CHANGES WHEN HOLDING UMBRELLA | SET TO VALUE LONGER THAN REFERENCE VALUE |
| (4) UNEVEN GRAVEL ROAD | GAIT AUTHENTICATION FAILS IN MOST CASES SINCE UNEVEN ROAD OR GRAVEL ROAD GREATLY AFFECTS WAY OF WALKING | RESET TRIGGER POINT ON FLAT ROAD ON NEARBY ROUTE |

FIG.10

| GEOGRAPHICAL OR WEATHER CONDITION | CHARACTERISTICS | ACCEPTANCE RATE (THRESHOLD VALUE) |
|---|---|---|
| (1) PLACE WHERE FLAT STRAIGHT ROAD CONTINUES | GAIT AUTHENTICATION IS MORE LIKELY TO SUCCEED WHEN WALKING LINEARLY | REDUCE ACCEPTANCE RATE TO BE LOWER THAN REFERENCE VALUE |
| (2) PLACE WITH MANY CORNERS AND SHORT STRAIGHT ROADS | GAIT AUTHENTICATION IS LIKELY TO FAIL SINCE WAY OF WALKING CHANGES FROM USUAL AT TIME OF TURNING (TURNING AT CORNER) | INCREASE ACCEPTANCE RATE TO BE HIGHER THAN REFERENCE VALUE |
| (3) BAD WEATHER (SNOW OR RAIN) | GAIT AUTHENTICATION IS LIKELY TO FAIL SINCE WAY OF WALKING CHANGES WHEN HOLDING UMBRELLA | INCREASE ACCEPTANCE RATE TO BE HIGHER THAN REFERENCE VALUE |
| (4) UNEVEN GRAVEL ROAD | GAIT AUTHENTICATION FAILS IN MOST CASES SINCE UNEVEN ROAD OR GRAVEL ROAD GREATLY AFFECTS WAY OF WALKING | INCREASE ACCEPTANCE RATE TO BE HIGHER THAN REFERENCE VALUE |

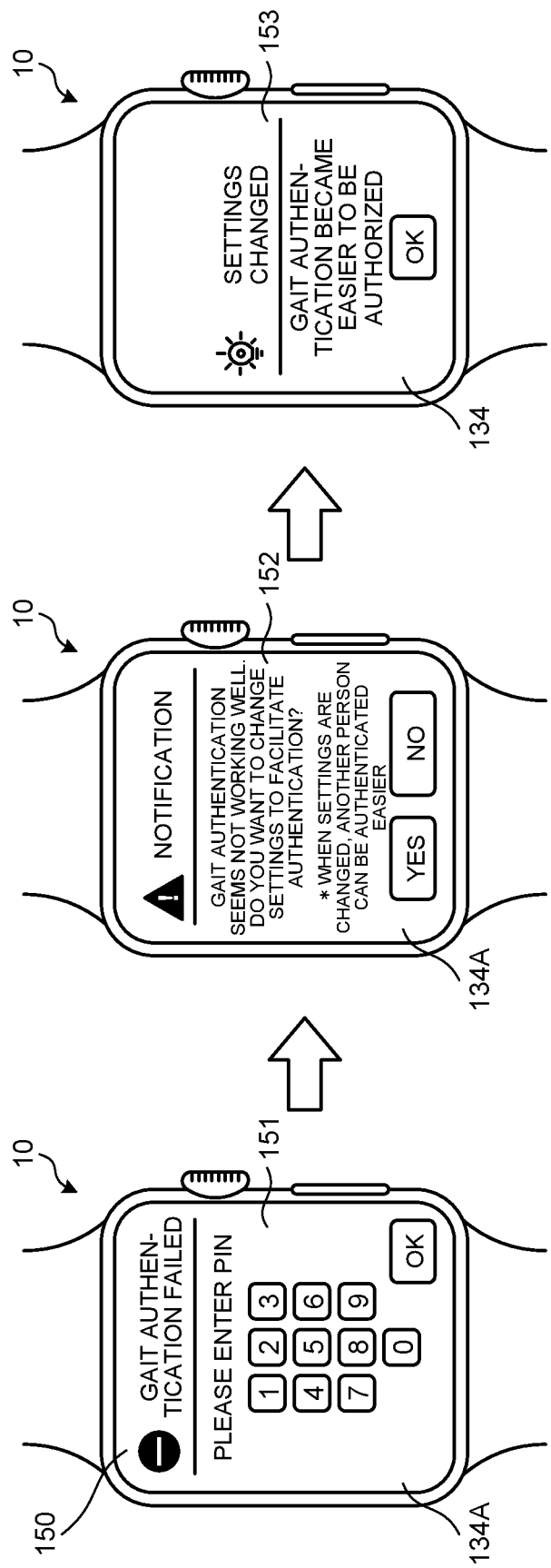

FIG.12

| DIFFERENCE BETWEEN THRESHOLD VALUE AND SCORE | ALTERNATIVE AUTHENTICATION MEANS | EXPLANATION OF AUTHENTICATION MEANS | LEVEL OF AUTHENTICATION ASSURANCE | LEVEL OF EASE |
|---|---|---|---|---|
| SMALL: LESS THAN 0.05 | RHYTHM AUTHENTICATION | TAP TERMINAL IN SAME MANNER AS REGISTERED RHYTHM WHILE TERMINAL IS IN POCKET | × CAN BE EASILY IMITATED BY OTHERS | ◎ IT CAN BE PERFORMED WHILE TERMINAL IS STILL IN POCKET |
| MEDIUM: GREATER THAN OR EQUAL TO 0.05 AND LESS THAN 0.2 | DRIVER'S LICENSE TOUCH (BELONGINGS AUTHENTICATION) | TOUCH NFC READER OF TERMINAL WITH DRIVER'S LICENSE | △ SINCE TERMINAL AND DRIVER'S LICENSE ARE BOTH PROPERTY FACTORS, IF BOTH ARE STOLEN, IT CAN BE BROKEN | △ IT IS ONLY NECESSARY TO TOUCH TERMINAL WITH DRIVER'S LICENSE |
| MEDIUM: GREATER THAN OR EQUAL TO 0.05 AND LESS THAN 0.2 | OPEN APP NOTIFICATION | RELEASE SCREEN LOCK OF TERMINAL AND OPEN APPLICATION FROM NOTIFICATION | ○ NECESSARY TO RELEASE SCREEN LOCK OF TERMINAL | ○ COMPLICATED OPERATION IS NOT REQUIRED |
| LARGE: GREATER THAN OR EQUAL TO 0.2 AND LESS THAN 0.95 | DRIVER'S LICENSE TOUCH +BIOMETRIC AUTHENTICATION | AUTHENTICATE WITH FINGERPRINT OR FACE AFTER PLACING DRIVER'S LICENSE TO NFC READER OF TERMINAL | ◎ TWO FACTORS OF BELONGINGS+ BIOMETRIC | × IT IS TEDIOUS TO DO BOTH |
| LARGE: GREATER THAN OR EQUAL TO 0.2 AND LESS THAN 0.95 | BIOMETRIC AUTHENTICATION MULTIMODAL | AUTHENTICATE WITH BOTH FINGERPRINT AND FACE (COMBINATION OF BIOMETRIC AUTHENTICATION IS NOT LIMITED TO THE ABOVE) | ◎ IT IS DIFFICULT TO ACQUIRE BOTH OF DIFFERENT PIECES OF BIOLOGICAL INFORMATION AND TO ATTACK | × IT IS TEDIOUS TO AUTHENTICATE WITH BOTH FINGERPRINT AND FACE |
| EXTREMELY LARGE: GREATER THAN OR EQUAL TO 0.95 | KNOWLEDGE AUTHENTICATION+ BIOMETRIC AUTHENTICATION+ BELONGINGS AUTHENTICATION | ENTER PASSWORD AND AUTHENTICATE WITH FINGERPRINT OR FACE, THEN TOUCH NFC READER OF TERMINAL WITH DRIVER'S LICENSE | ◎◎ ALL THREE AUTHENTICATION FACTORS | ×× PASSWORD IS OFTEN FORGOTTEN |

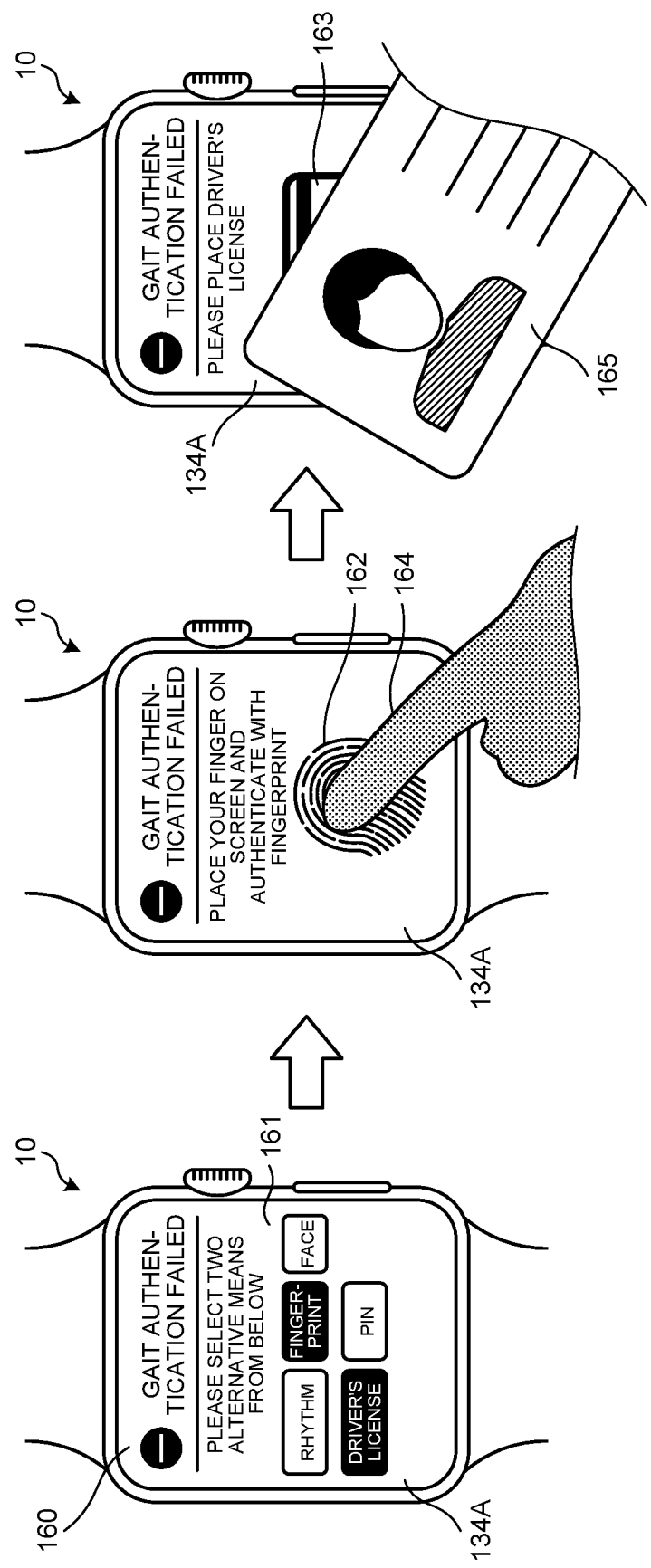

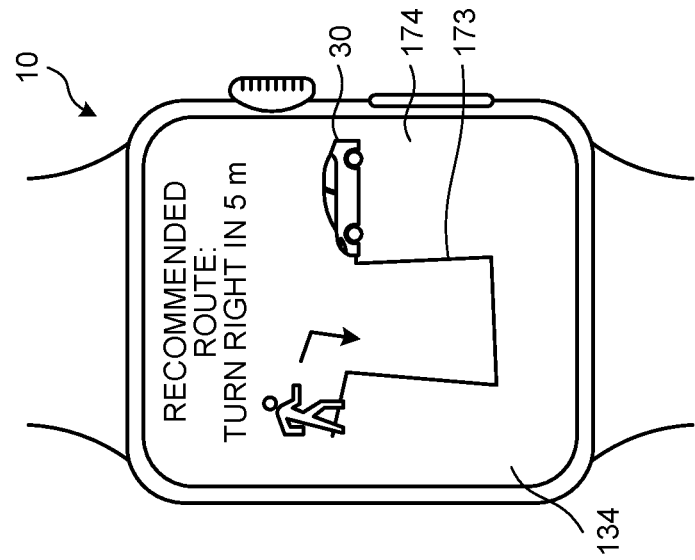
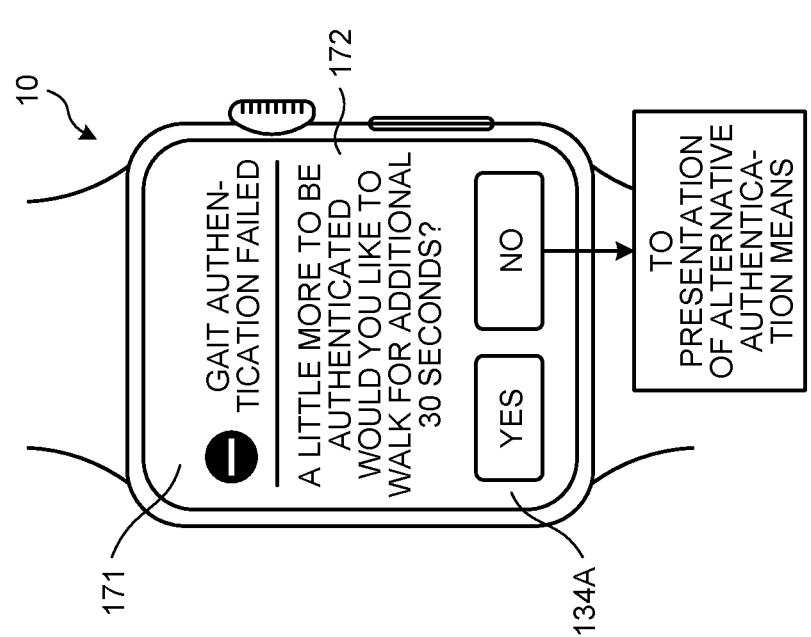
FIG.14

INFORMATION PROCESSING DEVICE, INFORMATION PROCESSING METHOD, AND INFORMATION PROCESSING SYSTEM FOR PERFORMING CONTINUOUS AUTHENTICATION

CROSS REFERENCE TO RELATED APPLICATIONS

This application is a U.S. National Phase of International Patent Application No. PCT/JP2021/022073 filed on Jun. 10, 2021, which claims priority benefit of Japanese Patent Application No. JP 2020-110828 filed in the Japan Patent Office on Jun. 26, 2020. Each of the above-referenced applications is hereby incorporated herein by reference in its entirety.

FIELD

The present disclosure relates to an information processing device, an information processing method, an information processing program, and an information processing system, and more particularly, to an information processing device, an information processing method, an information processing program, and an information processing system that perform personal authentication before predetermined operation on a control target.

BACKGROUND

In recent years, technology of performing recognition or discrimination on the basis of collected sensor information and technology of controlling operation of a device or the like on the basis of sensor information have become widespread. For example, Patent Literature 1 discloses technology of including a determining unit that determines access to a geofence on the basis of collected sensor information and determining, by the determining unit, determination related to the access on the basis of a learning result learned in association with data related to the access.

In addition, as technology for performing recognition or discrimination based on sensor information, for example, there is a concept of continuous authentication in which the authenticity of a person is continuously measured at all times by using the motion, the habit of position information, or the like measured by a motion sensor or a global navigation satellite system (GNSS). In this continuous authentication, there is technology of executing authentication (gait authentication) of a user on the basis of motion information in which a motion (for example, the way of walking) of the user registered in advance is continuously captured by a sensor (acceleration sensor). In this gait authentication, for example, there is no need to force the user to perform authentication operation like in biometric authentication such as fingerprint authentication or face authentication, and there is an advantage that the user does not need to consciously perform specific authentication operation.

CITATION LIST

Patent Literature

Patent Literature 1: WO 2018/154900 A

SUMMARY

Technical Problem

Meanwhile, in the continuous authentication including the gait authentication, there is a possibility that the authentication fails even when the registered person is actually using (false rejection rate; FRR). For this reason, in a case where the continuous authentication is simply adopted as the authentication technology for executing operation on a control target, there are cases where a user notices that the continuous authentication has failed only when the user performs operation on the control target, and thus cases where the user experience is impaired are conceivable.

The present disclosure has been made in view of the above, and an object of the disclosure is to provide an information processing device, an information processing system, an information processing method, and an information processing program capable of preventing impairment of the user experience when continuous authentication of a user is performed on a control target.

Solution to Problem

In order to solve the above described problems and achieve the purpose, an information processing device includes: a trigger point acquiring unit that acquires a trigger point at which continuous authentication of a user is performed, the trigger point passed through before a point at which predetermined operation on a control target is performed; a continuous authentication unit that performs the continuous authentication on a basis of motion information obtained by continuously measuring a motion of the user when the trigger point is passed; and a notification unit that notifies the user that the continuous authentication has failed in a case where the continuous authentication has failed.

Moreover, an information processing method according to the present disclosure includes the steps of: by a processor, acquiring a trigger point at which continuous authentication of a user is performed, the trigger point passed through before a point at which predetermined operation on a control target is performed; performing the continuous authentication on a basis of motion information obtained by continuously measuring a motion of the user when the trigger point is passed; and notifying the user that the continuous authentication has failed in a case where the continuous authentication has failed.

Moreover, an information processing program according to the present disclosure for causing a computer to function as an information processing device, the information processing device includes: a trigger point acquiring unit that acquires a trigger point at which continuous authentication of a user is performed, the trigger point passed through before a point at which predetermined operation on a control target is performed; a continuous authentication unit that performs the continuous authentication on a basis of motion information obtained by continuously measuring a motion of the user when the trigger point is passed; and a notification unit that notifies the user that the continuous authentication has failed in a case where the continuous authentication has failed.

Moreover, an information processing system according to the present disclosure includes an information processing terminal and an information processing server, wherein the information processing terminal includes: a trigger point acquiring unit that acquires a trigger point at which continuous authentication of a user is performed, the trigger point passed through before a point at which predetermined operation on a control target is performed; a continuous authentication unit that performs the continuous authentication on a basis of motion information obtained by continuously measuring a motion of the user when the trigger point is passed; and a notification unit that notifies the user that the continuous authentication has failed in a case where the continuous authentication has failed, and the information processing server comprises a trigger point setting unit that sets the trigger point.

BRIEF DESCRIPTION OF DRAWINGS

FIG. 6 is a table illustrating a specific example of setting timing of a trigger point.

FIG. 7 is a flowchart illustrating an operation procedure for setting a trigger point.

FIG. 8 is a table illustrating specific examples of the type of information processing terminal and a predetermined period of time to be set.

FIG. 9 is a table illustrating specific examples of geographical or weather conditions and a predetermined period of time t to be set.

FIG. 10 is a table illustrating specific examples of geographical or weather conditions and the acceptance rate.

FIG. 11 is a diagram illustrating an example of a series of user interfaces related to modification of a gait authentication threshold value displayed on an information processing terminal.

FIG. 12 is a table illustrating specific examples of alternative authentication means classified depending on a difference value between a gait authentication score and the gait authentication threshold value.

FIG. 13 is an example of a series of user interfaces related to selection of an alternative authentication means displayed on the information processing terminal.

FIG. 14 is an example of a series of user interfaces related to redoing of gait authentication displayed on the information processing terminal.

DESCRIPTION OF EMBODIMENTS

Hereinafter, preferred embodiments of the present disclosure will be described in detail by referring to the accompanying drawings. Note that, in the present specification and the drawings, components having substantially the same functional configuration are denoted by the same symbols, and redundant description is omitted.

Note that the description will be given in the following order.

1. Overview of Present Disclosure
2. Present Embodiment
2.1. Functional Configuration Example of Information Processing System 1
2.2. Functional Configuration Example of Vehicle 30
2.3. Operation on Vehicle 30 by Information Processing System 1
2.4. Specific Example of Setting Timing of Trigger Point
2.5.1. First Specific Example of Trigger Point Determination
2.5.2. Second Specific Example of Trigger Point Determination
2.5.3. Third Specific Example of Trigger Point Determination
2.6.1. First Specific Example of Determination of Gait Authentication Threshold Value
2.6.2. Second Specific Example of Determination of Gait Authentication Threshold Value
2.6.3. Third Specific Example of Determination of Gait Authentication Threshold Value
2.6.4. Fourth Specific Example of Determination of Gait Authentication Threshold Value
2.7.1. First Specific Example of Determination of Alternative Authentication Means
2.7.2. Second Specific Example of Determination of Alternative Authentication Means
2.7.3. Third Specific Example of Determination of Alternative Authentication Means
2.8. Specific Example of Notification of Failure of Gait Authentication and Alternative Authentication Means
3. Hardware Configuration Example
4. Summary

1. Overview of Present Disclosure

Figure 1:
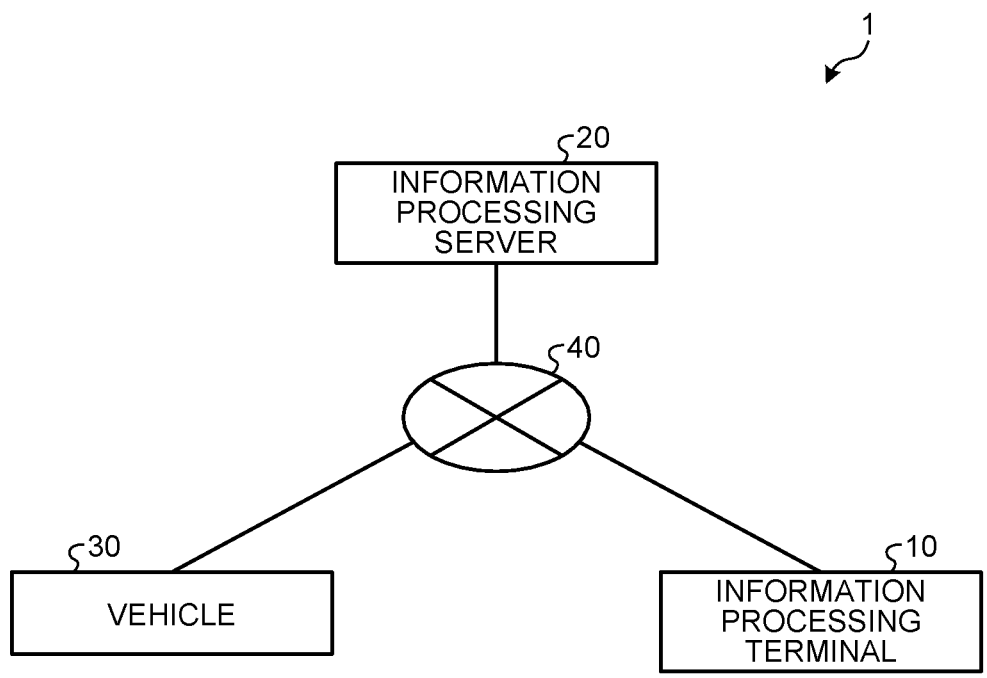
FIG. 1 is an explanatory diagram illustrating a configuration of an information processing system including an information processing device according to an embodiment of the present disclosure.
Figure 2:
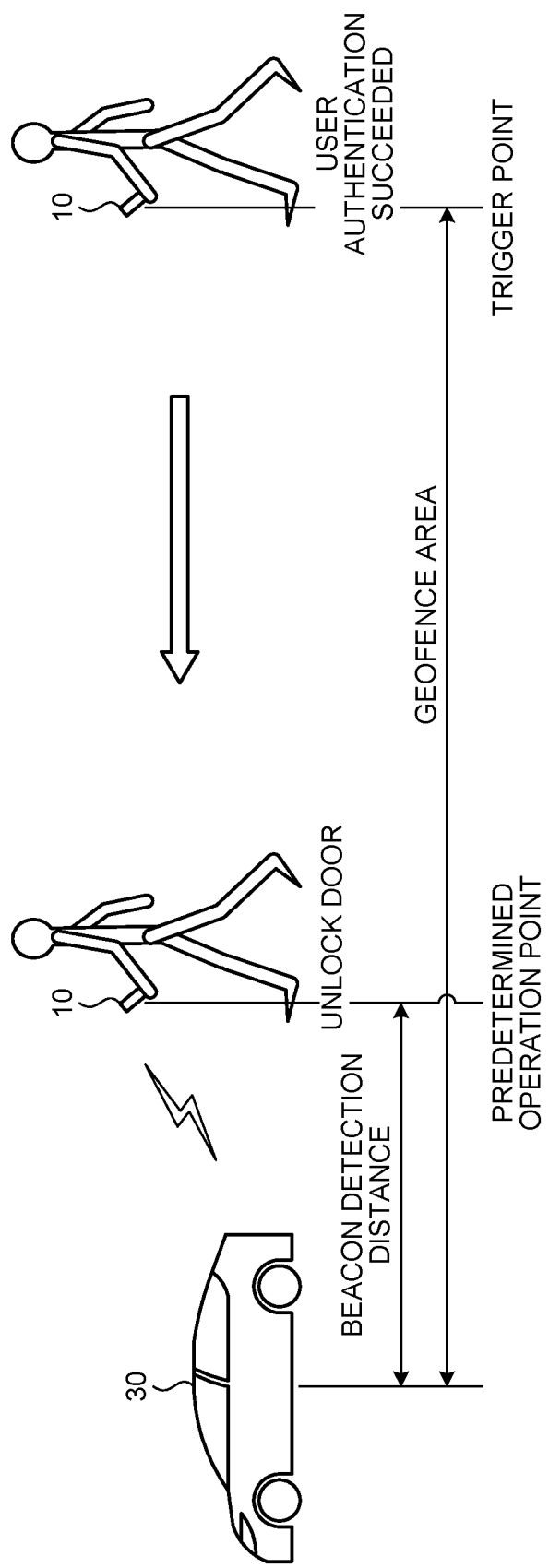
FIG. 2 is a schematic diagram illustrating the operation of the information processing system.
Figure 3:
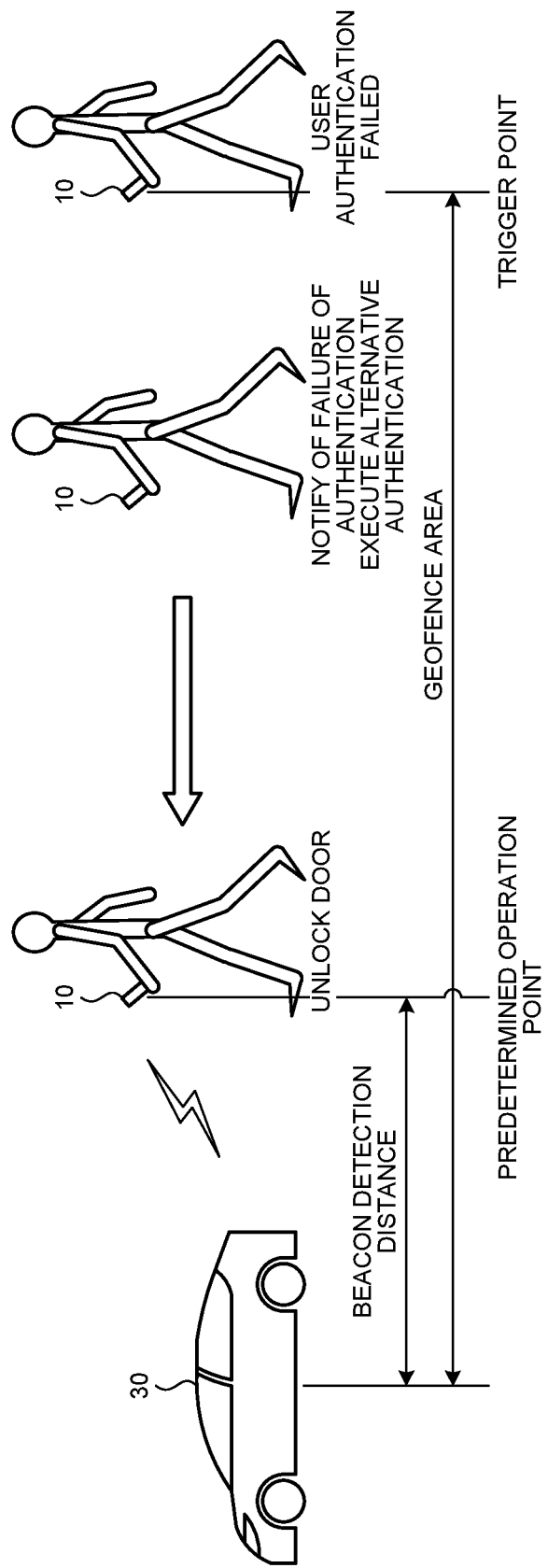
FIG. 3 is a schematic diagram illustrating the operation of the information processing system.

First, an overview of an embodiment of the present disclosure will be described with reference to the drawings. FIG. 1 is an explanatory diagram illustrating a configuration of an information processing system including an information processing device according to an embodiment of the present disclosure. FIGS. 2 and 3 are schematic diagrams illustrating the operation of the information processing system. As illustrated in FIG. 1, in the embodiment of the present disclosure, an information processing system 1 includes an information processing terminal (information processing device) 10 and an information processing server (information processing device) 20. In addition, the information processing terminal 10, the information processing server 20, and the vehicle (control target and traveling body) 30 are communicably connected to each other via a network 40.

The information processing terminal 10 performs continuous authentication for executing predetermined operation on the vehicle 30 on the basis of motion information obtained by continuously measuring the motion of a user. Continuous authentication is technology of authenticating whether or not the user is the person himself/herself using continuous motion information, habitual position information, and the like of the user. The information processing terminal 10 executes the predetermined operation on the vehicle 30 in a case where the continuous authentication is successful. This predetermined operation includes, for example, predetermined remote operation such as unlocking doors of the vehicle 30 by keyless entry.

As illustrated in FIG. 2, the continuous authentication is executed at a trigger point set as a geofence. A geofence refers to technology of providing a designated area in a space and causing execution of a preset function (continuous authentication in the present embodiment) by detecting access to the designated area. A trigger point refers to a position where the continuous authentication is performed on the basis of detection of access to the designated area. Access to the designated area is detected on the basis of positioning information obtained by a global navigation satellite system (GNSS) or the like. In the present embodiment, a designated area of a geofence is provided around the vehicle 30, and a trigger point is set on a part of an outer edge of the designated area (for example, on a route to the vehicle 30). Moreover, the trigger point is set at a position separated from the vehicle 30 than a point (position) at which the unlocking of the doors is executed, that is, a position that is passed before the unlocking of doors is executed. The continuous authentication includes gait authentication based on motion information obtained by continuously measuring walking of the user until the user reaches the trigger point.

In addition, in a case where the gait authentication has succeeded, the information processing terminal 10 executes the operation (control) of unlocking the doors on the vehicle 30 at a position (predetermined operation point) closer to the vehicle 30 than the trigger point is. The arrival at the predetermined operation point where the doors are unlocked can be determined, for example, by detection of a beacon signal transmitted from the vehicle 30. According to the present configuration, personal authentication is performed by gait authentication while the user is approaching the vehicle 30 on foot, and thus it is possible to unlock the doors of the vehicle 30 without actually operating a key, thereby enabling improvement in the convenience. Furthermore, according to this configuration, since an actual key operation is unnecessary when unlocking the doors of the vehicle 30, it is also possible to prevent a so-called relay attack at the time of keyless entry. The predetermined operation on the vehicle 30 is not limited to unlocking the doors, and the engine or the air conditioner of the vehicle 30 may be activated in conjunction with unlocking of the doors.

Since the above-described gait authentication is executed on the basis of motion information of the user obtained by continuously measuring the walking (motion) of the user, it is not necessary to force the user to perform authentication operation as in biometric authentication such as fingerprint authentication or face authentication. Therefore, there is an advantage that the user does not need to consciously perform a specific authentication operation. On the other hand, depending on the way of walking of the user, there is a possibility that the gait authentication fails even for a registered person (false rejection rate; FRR). Therefore, in a case where the gait authentication is simply adopted as the authentication for unlocking the doors of the vehicle 30, the user may notice that the gait authentication has failed only when the user tries to open a door of the vehicle 30, and thus cases where the user experience is impaired are presumed.

Therefore, as illustrated in FIG. 3, the information processing terminal 10 notifies the user that the gait authentication has failed when the gait authentication fails. The information processing terminal 10 can notify the fact of the failure by displaying character information on a display device of the information processing terminal 10, for example. This notification is preferably performed between the trigger point and the predetermined operation point. According to the present disclosure, the user is notified that the gait authentication has failed in a case where the gait authentication has failed. Therefore, it is possible to prevent the user from noticing the failure of the continuous authentication only when the user actually tries to open a door of the vehicle 30, and thus it is possible to prevent impairment of the user experience.

In addition, the information processing terminal 10 performs the alternative authentication of the user for the vehicle 30 using a selected alternative authentication means. An alternative authentication means requires a higher level of authentication assurance than the gait authentication (continuous authentication) and includes at least one of a biometric authentication means, a knowledge authentication means, or a belongings authentication means. Selecting an alternative authentication means may be performed by the information processing terminal 10 in accordance with a predetermined rule, or the user may be prompted to select an alternative authentication means together with a notification notifying that the gait authentication has failed. According to the present disclosure, in a case where the gait authentication has failed, alternative authentication of the user is performed by using a selected alternative authentication means, and thus, the personal authentication for reliably unlocking the doors is performed by the alternative authentication. Therefore, even in a case where the gait authentication has failed, the doors of the vehicle 30 are unlocked by the alternative authentication, and thus the convenience is improved, and impairment of the user experience can be prevented.

The information processing terminal 10 may be, for example, a smartphone, a tablet, a mobile phone, a wearable device, or the like. Furthermore, the wearable device includes, for example, a head-mounted display, a glasses-type (AR glasses) device, a bearable device, a wristband-type device, and the like.

The information processing server 20 illustrated in FIG. 1 is an information processing device that assists the gait authentication (continuous authentication) executed by the information processing terminal 10. That is, the information processing server 20 has a function of acquiring the parking position of the vehicle 30 and setting the position of the trigger point on the basis of the position of the vehicle 30. In this case, the information processing server 20 may adjust the position of the trigger point on the basis of action history information of walking of the user, map information around the vehicle 30, weather information, and the like. The information processing server 20 also has a function of setting a gait authentication threshold value used in a case where the information processing terminal 10 performs the gait authentication. This gait authentication threshold value is for determining success or failure of the gait authentication in comparison with a score indicating the authenticity of the user. In this case, the information processing server 20 may adjust the gait authentication threshold value on the basis of the action history information of walking of the user, the map information around the vehicle 30, and the like.

The vehicle 30 is a control target on which the information processing terminal 10 performs predetermined operation. The vehicle 30 is, for example, a self-propelled traveling body such as an automobile, and includes a general automobile driven by a user, and an autonomous driving vehicle or a robot autonomously driven by an autonomous driving system. In the present embodiment, the vehicle 30 includes at least doors for accessing the vehicle 30 and a door locking device that locks or unlocks the doors. The vehicle 30 further includes, for example, tires that rolls when the vehicle 30 travels, a driving unit that rotationally drives the tires, and a steering unit that changes a traveling direction of the vehicle 30.

The network 40 has a function of connecting the information processing terminal 10, the information processing server 20, and the vehicle 30. The network 40 may include a public line network such as the Internet, a telephone line network, or a satellite communication network, various local area networks (LANs) including Ethernet (registered trademark), a wide area network (WAN), or the like. Furthermore, the network 40 may include a dedicated line network such as an Internet protocol-virtual private network (IP-VPN). Furthermore, the network 40 may include a wireless communication network such as Wi-Fi (registered trademark) or Bluetooth (registered trademark). In addition to the network 40, the information processing terminal 10 and the vehicle 30 are communicably connected by a beacon signal (RF beacon).

An example of the configuration of the information processing system 1 according to the present embodiment has been described above, however, the present invention is not limited to this example. For example, although the configuration including the information processing terminal 10 and the information processing server 20 has been illustrated above as an example, the functions of the information processing terminal 10 and the information processing server 20 according to the embodiment may be implemented by a single information processing device. For example, the information processing terminal 10 according to the embodiment can further include a function equivalent to the function of setting the trigger point and the gait authentication threshold value of the information processing server 20.

2. Present Embodiment

<2.1. Functional Configuration Example of Information Processing System 1>

Figure 4:
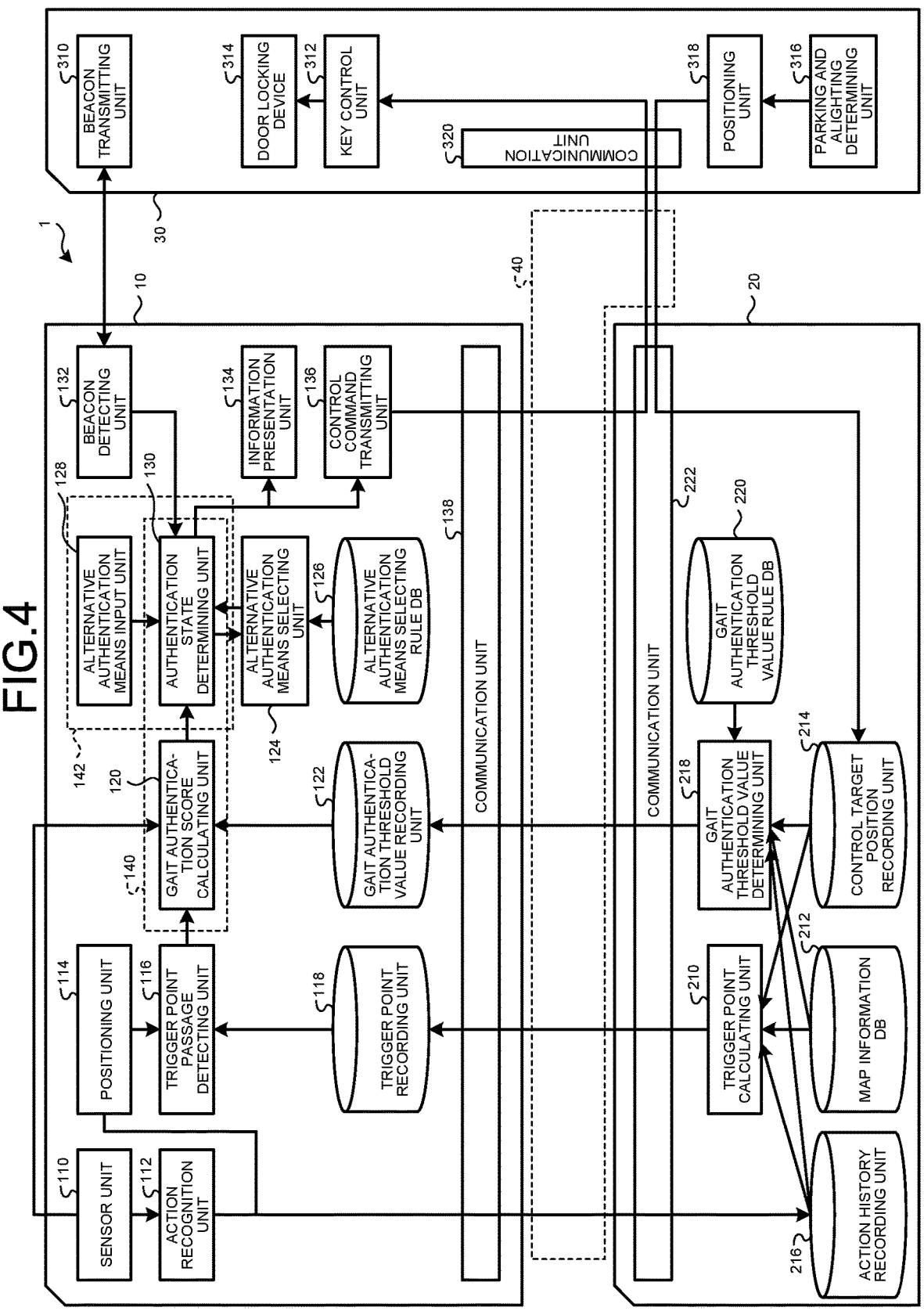
FIG. 4 is a functional block diagram illustrating an example of a functional configuration of the information processing system and a vehicle.

Next, a functional configuration example of the information processing system 1 according to the embodiment will be described. FIG. 4 is a functional block diagram illustrating an example of a functional configuration of the information processing system 1 and the vehicle 30. As illustrated in FIG. 4, the information processing terminal 10 of the information processing system 1 includes a sensor unit 110, an action recognition unit 112, a positioning unit 114, a trigger point passage detecting unit 116, a trigger point recording unit (trigger point acquiring unit) 118, a gait authentication score calculating unit 120, a gait authentication threshold value recording unit 122, an alternative authentication means selecting unit 124, an alternative authentication means selecting rule DB 126, an alternative authentication means input unit 128, an authentication state determining unit 130, a beacon detecting unit 132, an information presentation unit (notification unit) 134, a control command transmitting unit 136, and a communication unit 138.

The sensor unit 110 is a sensor that collects sensor information including user's motion information in order to perform the gait authentication (continuous authentication) and action recognition of the user. Examples of the sensor information to be collected include acceleration information, angular velocity information, geomagnetic information, acoustic information, vibration information, time information, and wireless signals such as Wi-Fi and Bluetooth/Bluetooth Low Energy (BLE). Therefore, the sensor unit 110 according to the embodiment includes an acceleration sensor, an angular velocity sensor, a geomagnetic sensor, an atmospheric pressure sensor, a temperature sensor, a sound sensor (microphone), a vibration sensor, a clock, various signal receiving modules, and others. Note that the types of sensors described above are merely examples, and the sensor unit 110 according to the embodiment may include a sensor other than the above.

The action recognition unit 112 receives input of various types of sensor information collected by the sensor unit 110 and recognizes the user's action (for example, stationary, walking, running, train, bus, car, bicycle, elevator, escalator, staircase, etc.) Specifically, it is possible to recognize whether the user is stationary, walking, or running on the basis of a waveform, cycles, a magnitude of the amplitude, and the like in acceleration information measured by the acceleration sensor.

The positioning unit 114 captures the position information of the information processing terminal 10 from information such as positioning information by a GNSS and a radio signal from a Wi-Fi access point.

The trigger point passage detecting unit 116 detects that the user carrying the information processing terminal 10 has passed the set trigger point on the basis of the information acquired from the positioning unit 114.

The trigger point recording unit 118 temporarily holds the trigger point set by the information processing server 20. The trigger point is stored as position information (coordinate information) of a specific point set by the information processing server 20. In the present embodiment, the trigger point recording unit 118 functions as a trigger point acquiring unit that acquires a trigger point that has been set.

The gait authentication score calculating unit 120 calculates a score indicating the authenticity of a registered user output by the gait authentication technology. The gait authentication score calculating unit 120 calculates the score at the timing when the trigger point passage detecting unit 116 detects passage through the trigger point. The gait authentication score calculating unit 120 has a learning model in which acceleration information, at the time of walking, of a plurality of people is learned in advance (for example, deep learning) and, by extracting a feature amount using the acceleration information collected by the acceleration sensor of the sensor unit 110 as input, calculates a score (gait authentication score) indicating the authenticity of the registered user and outputs the score. In addition, acceleration information in which a predetermined period of time (for example, 5 seconds) is set as one frame may be sequentially input to the gait authentication score calculating unit 120, and the calculated scores may be sequentially output.

The gait authentication threshold value recording unit 122 temporarily holds the gait authentication threshold value (continuous authentication threshold value) set by the information processing server 20. The gait authentication threshold value is compared with the score output by the gait authentication score calculating unit 120 in the authentication state determining unit 130. In the present embodiment, if the score is larger than the gait authentication threshold value, it is determined that the gait authentication has succeeded (the user himself/herself), and if the score is less than or equal to the gait authentication threshold value, it is determined that the gait authentication has failed (not the user himself/herself).

The alternative authentication means selecting unit 124 selects an alternative authentication means when the gait authentication fails. The alternative authentication means is not authenticated on the basis of motion information of the user as in the gait authentication, and one or a combination of a plurality of the biometric authentication means, the knowledge authentication means, and the belongings authentication means is selected. In this case, the alternative authentication means selecting unit 124 may select at least one alternative authentication means in accordance with a predetermined rule. In addition, the alternative authentication means selecting unit 124 may output a user interface related to a plurality of alternative authentication means to prompt the user to select and may select at least one alternative authentication means on the basis of an instruction of the user input in the user interface.

The alternative authentication means selecting rule DB 126 is a database (DB) that contains rules regarding selection of an effective alternative authentication means in a case where the gait authentication fails. For example, a rule may be defined in which a difference value between a gait authentication score threshold value and a score is derived, and an alternative authentication means associated with the magnitude of the difference value is selected. Alternatively, a rule may be defined in which a plurality of alternative authentication means is presented to the user, and the user is prompted to select one or a plurality of alternative authentication means. In addition, in the alternative authentication means selecting rule DB 126, registration information (for example, biometric information such as fingerprint information) regarding the registered person is stored for each alternative authentication means for determination of the success or failure of the alternative authentication.

The alternative authentication means input unit 128 is a device for inputting information for executing alternative authentication using the selected alternative authentication means. The alternative authentication means input unit 128 can include, for example, a biometric authentication device such as a fingerprint sensor or a belongings authentication device such as a near field communication (NFC) reader for reading a contactless IC tag of an identification card. In addition, the alternative authentication means input unit 128 can include a knowledge authentication device such as a touch panel or a microphone for inputting a password in the user interface.

The authentication state determining unit 130 determines the authentication state on the basis of the success or failure of the gait authentication or the alternative authentication described above. Specifically, the authentication state determining unit 130 determines that the gait authentication is in a successful state if the score output by the gait authentication score calculating unit 120 is larger than the gait authentication threshold value and determines that the gait authentication is in a failed state if the score is less than or equal to the gait authentication threshold value. In addition, in a configuration in which scores are sequentially output by regarding a predetermined period of time (for example, five seconds) as one frame, in a case where a score greater than or equal to a certain value (gait authentication threshold value) is repeatedly output a predetermined number of times, it may be determined that the gait authentication is in a successful state. In this configuration, it is possible to execute highly accurate gait authentication (continuous authentication). In addition, the authentication state determining unit 130 reads the registration information of the user corresponding to the alternative authentication means selected from the alternative authentication means selecting rule DB 126, collates the registration information with the information input via the alternative authentication means input unit 128, and determines whether or not the user is the person himself/herself. In the present embodiment, the gait authentication score calculating unit 120 and the authentication state determining unit 130 are included in a gait authentication unit (continuous authentication unit) 140, and the alternative authentication means input unit 128 and the authentication state determining unit 130 are included in an alternative authentication unit 142.

In addition, the beacon detecting unit 132 detects a beacon signal transmitted from the vehicle 30 and performs proximity determination. When the beacon detecting unit 132 receives the beacon signal, it is determined that the user carrying the information processing terminal 10 has approached the vehicle 30 within a predetermined distance range.

The information presentation unit 134 presents information regarding the success or failure of the gait authentication or the alternative authentication means to the user. Specifically, the information presentation unit 134 includes a display device that displays visual information and displays information indicating that the continuous authentication has failed, various user interfaces, the selected alternative authentication means, and the like on the display device. Examples of the display device include a liquid crystal display (LCD) device, an organic light emitting diode (OLED) device, a touch panel, and the like. Furthermore, the information presentation unit 134 may not only display the above information on the display device but also include feedback by sound or vibration in addition to the display of the information. In the present embodiment, the information presentation unit 134 functions as a notification unit that notifies the user of the failure when the gait authentication (continuous authentication) fails.

The control command transmitting unit 136 transmits a command for performing predetermined operation on the vehicle 30 (control target) to the vehicle 30 via the information processing server 20. In the present embodiment, the control command transmitting unit 136 transmits a command for controlling to unlock the doors to the vehicle 30.

The communication unit 138 is an interface having a function of transmitting and receiving various types of information to and from the information processing server 20 via the network 40.

Next, the information processing server 20 will be described. As illustrated in FIG. 2, the information processing server 20 includes a trigger point calculating unit (trigger point setting unit) 210, a map information DB 212, a control target position recording unit 214, an action history recording unit 216, a gait authentication threshold value determining unit (continuous authentication threshold value setting unit) 218, a gait authentication threshold value rule DB 220, and a communication unit 222.

The trigger point calculating unit 210 sets a trigger point which is a position for determining the authentication state of the gait authentication for the vehicle 30. The trigger point may be set at an intersection of an outer edge of a designated area set at a predetermined distance radius centered at the vehicle 30 and a path on which the user is walking. In addition, the trigger point calculating unit 210 may set the trigger point at a position where the traveling time until the user arrives at the vehicle 30 equals a predetermined period of time t. Furthermore, the predetermined period of time t may be adjusted depending on the place where the user is carrying the information processing terminal 10 (whether it is in a pocketed or in a bag), the type of the information processing terminal 10 (whether it is a smartphone or an eyeglass-type device), the road surface condition of the route, or the weather condition (whether it is raining or not). According to this configuration, in a case where the gait authentication fails, it is possible to notify the user of the failure safely and reliably. The position information of the set or adjusted trigger point is transmitted to the information processing terminal 10 via the network 40 and stored in the trigger point recording unit 118. In the present embodiment, the trigger point calculating unit 210 functions as a trigger point setting unit that sets a trigger point.

The map information DB 212 is a database in which map information to be referred to when a trigger point is set is recorded. The map information DB 212 stores at least road information around a position where the vehicle 30 is parked. In addition, a road surface condition of the surrounding roads (for example, whether or not the road surface is paved) and the like may be stored.

The control target position recording unit 214 temporarily holds position information of a position where the vehicle 30 as a control target is parked. The position information of the vehicle 30 is measured and acquired by the vehicle 30 and transmitted to the information processing server 20 via the network 40.

The action history recording unit 216 records a past action recognition result of the user and a history of positioning information. Specifically, the action recognition result of the user recognized by the action recognition unit 112 and the position information of the information processing terminal 10 measured by the positioning unit 114 are associated with each other and stored in time series as a history. By referring to the information stored in the action history recording unit 216, it is possible to recognize the position of the house where the user lives usually or daily actions of the user. It is also preferable that the action history recording unit 216 stores the type (smartphone, tablet, mobile phone, wearable device, etc.) of the information processing terminal 10 carried by the user.

The gait authentication threshold value determining unit 218 sets (determines) a gait authentication threshold value optimal for determining the success or failure of the gait authentication. In this case, the gait authentication threshold value determining unit 218 can set the gait authentication threshold value to a predetermined reference value and can adjust the gait authentication threshold value higher or lower with respect to the reference value by referring to the gait authentication threshold value rule DB 220. The gait authentication threshold value determining unit 218 may adjust the gait authentication threshold value depending on the place where the vehicle 30 is parked or the time elapsed after parking. Furthermore, the gait authentication threshold value determining unit 218 may adjust the gait authentication threshold value depending on the road surface condition and the weather condition (whether it is raining or not) of the route to the place where the vehicle 30 is parked. Furthermore, the gait authentication threshold value determining unit 218 may adjust the gait authentication threshold value depending on the habit of the user's action. With this configuration, for example, it is possible to reduce a risk of another person spoofing the user and stealing the vehicle 30 and also to raise the acceptance rate of the gait authentication (ease of authentication of the person himself/herself). In the present embodiment, the gait authentication threshold value determining unit 218 functions as a continuous authentication threshold value setting unit that sets a gait authentication threshold value (continuous authentication threshold value).

The gait authentication threshold value rule DB 220 is a database that defines a rule for determining a gait authentication threshold value for determining the success or failure of the gait authentication. Generally, in authentication technology including the gait authentication, a false acceptance rate (FAR) and a false rejection rate (FRR) are in a trade-off relationship. Therefore, the balance between the success and failure of the authentication is maintained by setting the gait authentication threshold value. Here, if the gait authentication threshold value is set to be smaller than the reference value (current value) (also expressed as increasing the acceptance rate), although erroneous rejection of the person himself/herself is reduced, the safety tends to be deteriorated since other people can also be easily accepted. In addition, if the gait authentication threshold value is set to be larger than the reference value (also expressed to as reducing the acceptance rate), although the safety is enhanced since it becomes difficult to accept other people, the usability tends to be deteriorated since it becomes easier to reject the person himself/herself. As described above, in the gait authentication, the success or failure of the authentication is determined after the gait authentication threshold value is set. However, in a case where a traveling body such as the vehicle 30 is a control target, the degree of risk regarding the vehicle 30 varies depending on the context including the surrounding environment of the place where the vehicle 30 is parked. Therefore, in view of the above, a rule for setting the gait authentication threshold value is defined to adjust the balance of the acceptance rate.

As the rule described above, for example, in a case where the vehicle is parked at a place where many people come and go, the risk of theft is high. Therefore, a rule may be defined in which the gait authentication threshold value is set higher than the reference value to lower the acceptance rate. In addition, in a case where the elapsed time from when the user has alighted the vehicle is longer than or equal to a predetermined period of time, a rule may be defined in which the gait authentication threshold value is set higher stepwise depending on the elapsed time to lower the acceptance rate. Furthermore, for example, in a case where the user walks on a route where a flat straight line continues, a rule may be defined in which the gait authentication threshold value is set higher than the reference value to lower the acceptance rate. Furthermore, in a case where the user walks on a route with many corners, a rule may be defined in which the gait authentication threshold value is set lower than the reference value to raise the acceptance rate. Furthermore, in a case where the gait authentication fails repeatedly, on the basis of an instruction of the user, a rule may be defined in which the gait authentication threshold value is set to be lower than the current location to raise the acceptance rate (change so as to avoid a failure of the continuous authentication).

The communication unit 222 is an interface having a function of transmitting and receiving various types of information to and from the information processing terminal 10 and the vehicle 30 via the network 40.

The functional configuration example of the information processing system 1 (the information processing terminal 10 and the information processing server 20) according to the embodiment has been described above. Note that the functional configuration described above by referring to FIG. 4 is merely an example, and the functional configuration of the information processing system 1 according to the embodiment is not limited to such an example. For example, the functions described above may be implemented in a distributed manner by a plurality of devices. Furthermore, as described above, each component included in the information processing server 20 can also be implemented as a function of the information processing terminal 10. The functional configurations of the information processing terminal 10 and the information processing server 20 according to the embodiment can be flexibly modified.

<2.2. Functional Configuration Example of Vehicle 30>

Next, a functional configuration of the vehicle will be described. The vehicle 30 includes a beacon transmitting unit 310, a key control unit 312, a door locking device 314, a parking and alighting determining unit 316, a positioning unit 318, and a communication unit 320.

The beacon transmitting unit 310 transmits a beacon signal for performing proximity determination of the information processing terminal 10. In the present embodiment, a beacon signal is transmitted at constant intervals after the user has alighted the vehicle. Note that the timing of starting the beacon transmission can be modified as appropriate, and for example, transmission of the beacon signal may be started after the user has passed through the trigger point.

The key control unit 312 performs control related to unlocking of the doors of the vehicle 30 in accordance with a received control command. Specifically, when a control command for unlocking the doors is received, the doors of the vehicle 30 are unlocked.

The door locking device 314 is a device for physically locking and unlocking the doors.

The parking and alighting determining unit 316 determines that the vehicle 30 is parked or the user has alighted. Specifically, the parking of the vehicle 30 can be determined by detecting that the vehicle speed has become 0 (km/h). In addition, the parking of the vehicle 30 can be determined by detecting that the engine of the vehicle 30 is stopped and that a select lever is moved to a parking range. In addition, alighting of the user can be determined by detecting a change in a measurement value of a load sensor provided in a seat of the vehicle 30 and opening and closing of a door of the vehicle (or locking of the door).

The positioning unit 318 captures the current position information of the vehicle 30 from information such as positioning information by a GNSS and a radio signal from a Wi-Fi access point.

The communication unit 320 is an interface having a function of transmitting and receiving various types of information to and from the information processing server 20 via the network 40.

The functional configuration example of the vehicle 30 controlled by the information processing system 1 (the information processing terminal 10 and the information processing server 20) according to the embodiment has been described above. Note that the functional configuration described above by referring to FIG. 4 is merely an example, and it is not limited to this example.

<2.3. Operation on Vehicle 30 by Information Processing System 1>

Figure 5A:
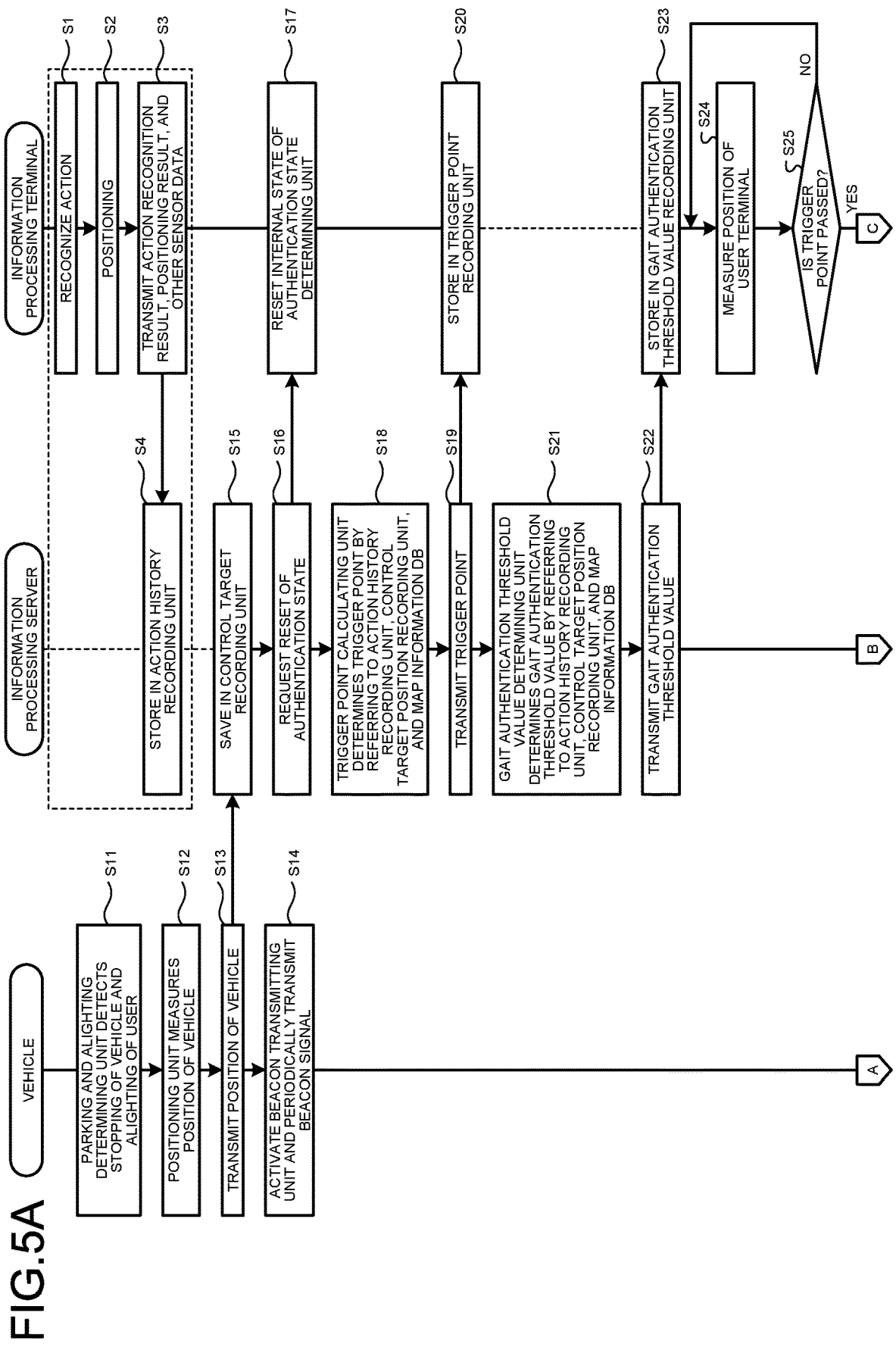
FIG. 5A is a flowchart illustrating an operation procedure of the information processing system.
Figure 5B:
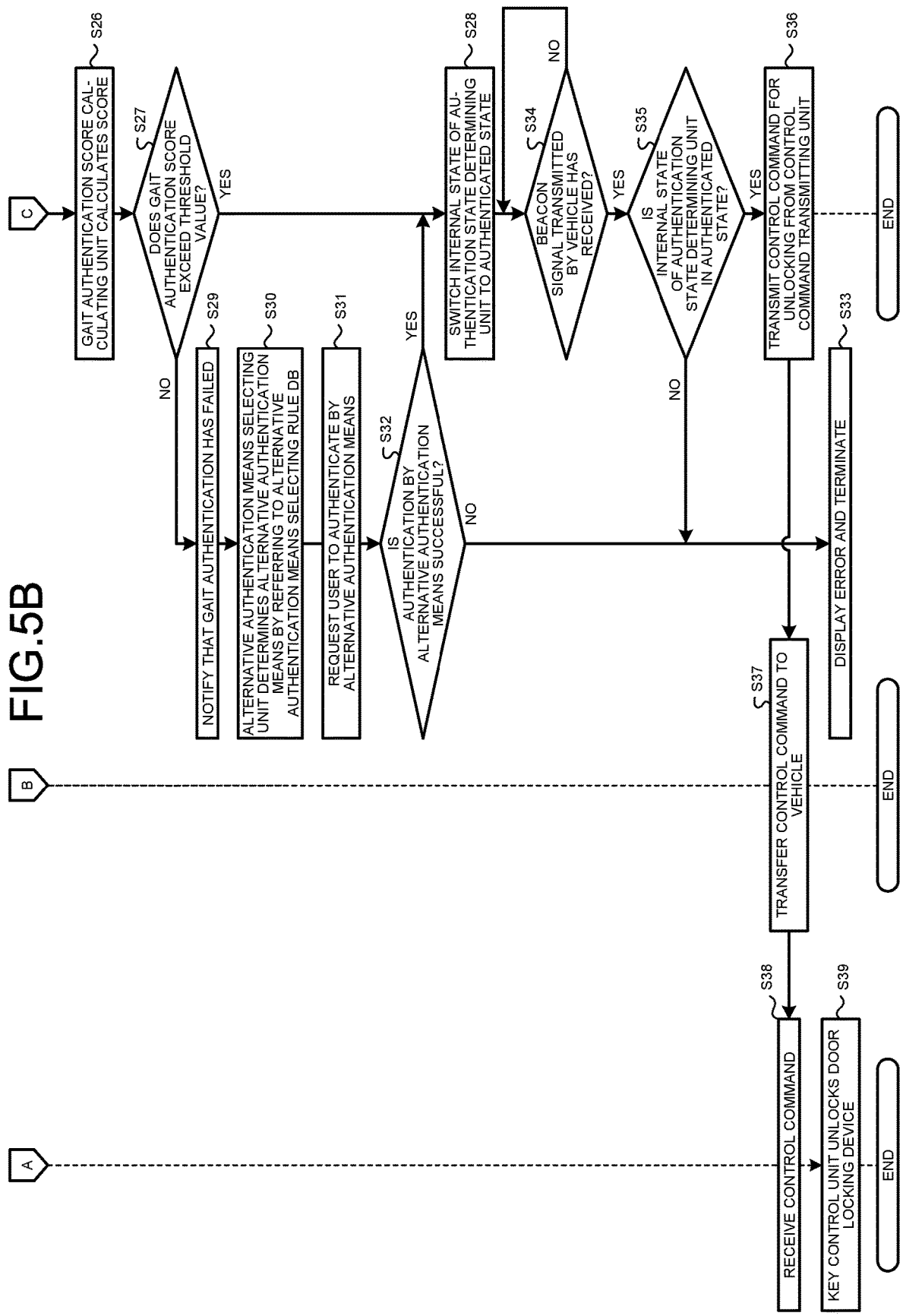
FIG. 5B is a flowchart illustrating an operation procedure of the information processing system.

Next, the operation of the information processing system will be described. FIGS. 5A and 5B are flowcharts illustrating an operation procedure of the information processing system.

As illustrated in FIG. 5A, the information processing terminal 10 performs action recognition of the user on the basis of each piece of sensor information of the sensor unit 110 (preliminary step S1) and performs positioning of the current position of the information processing terminal 10 using the positioning unit 114 (preliminary step S2). Next, the information processing terminal 10 transmits the action recognition result, the positioning result, and various types of sensor information to the information processing server 20 (preliminary step S3). The information processing server 20 receives these pieces of data and stores them in the action history recording unit 216 (preliminary step S4). These preliminary steps S1 to S4 are repeatedly executed at predetermined intervals in the background.

When the vehicle 30 as a control target arrives at the destination and the parking and alighting determining unit 316 detects parking of the vehicle 30 and alighting of the user (step S11), the positioning unit 318 of the vehicle 30 measures the current position of the vehicle 30 and transmits the measured position information to the information processing server 20 (step S13). Furthermore, the beacon transmitting unit 310 of the vehicle 30 periodically transmits a beacon signal (step S14).

The information processing server 20 receives the position information of the position where the vehicle 30 is parked and stores the position information in the control target position recording unit 214 (step S15). In this case, the position information of the vehicle 30 previously stored in the control target position recording unit 214 is preferably overwritten with new position information.

In addition, after the position information of the vehicle 30 is stored, the information processing server 20 transmits a request signal for resetting the authentication state to the information processing terminal 10 (step S16). After receiving this request signal, the information processing terminal 10 resets the internal state of the authentication state determining unit 130 (step S17). That is, in the previous authentication operation, the internal state of the authentication state determining unit 130, which is authenticated, is set to an unauthenticated state. Note that, in the present embodiment, the authenticated state refers to a state in which the authentication is successful in the gait authentication or alternative authentication.

In addition, the trigger point calculating unit 210 of the information processing server 20 determines a trigger point for performing the gait authentication (step S18). In this case, the trigger point calculating unit 210 calculates and determines (sets) a trigger point by referring to various types of information stored in the action history recording unit 216, the map information DB 212, and the control target position recording unit 214. Note that a specific example of setting timing of a trigger point and a specific example of the trigger point setting will be described later.

Next, the information processing server 20 transmits the position information of the determined trigger point to the information processing terminal 10 via the network 40 (step S19).

The information processing terminal 10 acquires the transmitted position information of the trigger point and stores the position information in the trigger point recording unit 118 (step S20). In this case, the position information of the trigger point previously stored in the trigger point recording unit 118 is preferably overwritten with new position information. The stored position information of the trigger point is output to the trigger point passage detecting unit 116.

Next, after transmitting the position information of the trigger point in the information processing server 20, the gait authentication threshold value determining unit 218 determines the gait authentication threshold value (step S21). In this case, the gait authentication threshold value determining unit 218 determines (sets) the gait authentication threshold value by referring to various types of information stored in the action history recording unit 216, the map information DB 212, and the control target position recording unit 214. Note that a specific example of determining the gait authentication threshold value will be described later.

Next, the information processing server 20 transmits the determined gait authentication threshold value to the information processing terminal 10 via the network 40 (step S22). In addition, the stored gait authentication threshold value is output to the gait authentication score calculating unit 120.

The information processing terminal 10 acquires the transmitted gait authentication threshold value and stores the gait authentication threshold value in the gait authentication threshold value recording unit 122 (step S23). In this case, the previously stored gait authentication threshold value is preferably overwritten with a new threshold value.

Next, the positioning unit 114 of the information processing terminal 10 periodically measures the current position of the information processing terminal (step S24). The position information of the measured current position is output to the trigger point passage detecting unit 116 as needed.

Next, the trigger point passage detecting unit 116 determines whether or not the user, that is, the information processing terminal 10, has passed the trigger point (step S25). In this determination, if no passage through the trigger point is detected (step S25; No), the processing is returned to step S24. Alternatively, as illustrated in FIG. 5B, if passage through the trigger point is detected (step S25; Yes), the gait authentication score calculating unit 120 calculates the gait authentication score (step S26). In this case, the gait authentication score calculating unit 120 has a learning model in which acceleration information, at the time of walking, of a plurality of people is learned in advance (for example, deep learning) and, by extracting a feature amount using the acceleration information (motion information) collected by the acceleration sensor of the sensor unit 110 as input, calculates a gait identification score indicating the authenticity of the registered user and outputs the score to the authentication state determining unit 130.

Next, the authentication state determining unit 130 determines whether or not the score output by the gait authentication score calculating unit 120 exceeds the gait authentication threshold value (step S27). In this determination, if the score exceeds the gait authentication threshold value (is larger than the gait authentication threshold value) (step S27; Yes), the authentication state determining unit 130 determines that the gait authentication has succeeded and switches the internal state to an authenticated state (step S28). On the other hand, if the score does not exceed the gait authentication threshold value (less than or equal to the gait authentication threshold value) (step S27; No), it is determined that the gait authentication has failed, and the information processing terminal 10 notifies the user of the failure of the gait authentication (step S29). Specifically, the information processing terminal 10 displays character information indicating that the gait authentication has failed on the display device of the information presentation unit 134. In this case, in order to reliably notify the user, it is preferable to perform notification by matching audio or vibration to the character information. According to this configuration, in a case where the gait authentication fails, the user is notified of the failure of the gait authentication. Therefore, it is possible to prevent the user from noticing the failure of the continuous authentication only when the user actually tries to open a door of the vehicle 30, and thus it is possible to prevent the user experience from being impaired.

Next, the information processing terminal 10 determines an alternative authentication means in place of the gait authentication (step S30). In this case, the alternative authentication means selecting unit 124 refers to various rules stored in the alternative authentication means selecting rule DB 126 and selects and determines an alternative authentication means. Note that a specific example of determination of the alternative authentication means will be described later.

The information processing terminal 10 requests (notifies) the user of the alternative authentication using the determined alternative authentication means (step S31). Specifically, the information processing terminal 10 displays a screen (user interface) prompting execution of the alternative authentication on the display device included in the information presentation unit 134 and accepts an instruction from the user regarding execution of the alternative authentication. Note that, when the execution of the alternative authentication is prompted, the user may be caused to select and execute the alternative authentication means, or a request related to the alternative authentication may be notified together with the fact that the gait authentication has failed.

When information related to the alternative authentication means is input via the alternative authentication means input unit 128, the information processing terminal 10 determines whether or not the alternative authentication using the alternative authentication means has succeeded (step S32). Specifically, the authentication state determining unit 130 reads the registration information of the user corresponding to the selected alternative authentication means from the alternative authentication means selecting rule DB 126, collates the registration information with the information input via the alternative authentication means input unit 128, and determines whether or not the user is the person himself/herself. In this determination, if the alternative authentication is successful (step S32; Yes), the processing proceeds to step S28 described above. Alternatively, if the alternative authentication has failed (step S32; No), an occurrence of an error is displayed on the display device of the information presentation unit 134, and the processing is entirely terminated (step S33). Note that another alternative authentication means may be newly selected, and alternative authentication using the alternative authentication means may be executed. In this case, it is preferable to proceed to step S33 described above in a case where none of the alternative authentication of a plurality of alternative authentication means has succeeded.

In step S28 described above, if it is determined that the gait authentication or the alternative authentication has succeeded and the internal state is switched to the authenticated state, the information processing terminal 10 determines whether or not the beacon signal transmitted from the vehicle 30 has been received (step S34). That is, it is determined whether or not the user (information processing terminal 10) has reached the vicinity of the vehicle (predetermined operation point). In this determination, if the beacon detecting unit 132 has not detected the beacon signal of the vehicle 30 (step S34; No), the processing is repeatedly executed until it is detected. On the other hand, if the beacon detecting unit 132 has detected a beacon signal of the vehicle 30 (step S34; No), subsequently, it is determined whether or not the internal state of the authentication state determining unit 130 is the authenticated state (step S35). In this determination, if the internal state is not the authenticated state (step S35; No), the processing proceeds to step S33 and is terminated. This makes it possible to prevent occurrence of erroneous operation due to reception of only the beacon signal. In addition, if the internal state is the authenticated state (step S35; Yes), the control command transmitting unit 136 of the information processing terminal 10 transmits a control command for unlocking to the information processing server 20 (step S36). Note that the information processing terminal 10 ends its operation with the above.

The communication unit 222 of the information processing server 20 transfers the transmitted control command for unlocking to the vehicle 30 (step S37). In the present embodiment, since the information processing server 20 receives the control command for unlocking, it is possible to accurately recognize the control content of the information processing terminal 10 for the vehicle 30 and the situation (operation situation) of locking and unlocking the doors of the vehicle 30. Note that the information processing server 20 ends its operation with the above.

When the vehicle 30 receives the control command that has been transferred (step S38), the key control unit 312 unlocks the door locking device 314 (step S39). In the present embodiment, since the door lock is released while the user is walking toward the vehicle 30 after the gait authentication or the alternative authentication succeeds, improvement of operability and convenience for the user can be implemented. Note that the vehicle 30 ends its operation with the above.

<2.4. Specific Example of Setting Timing of Trigger Point>

Next, setting timing of a trigger point will be described. FIG. 6 is a diagram illustrating a specific example of setting timing of a trigger point. In the present embodiment, the personal authentication for unlocking the doors of the vehicle 30 is executed using the gait authentication (continuous authentication) technology. Since a traveling body such as the vehicle 30 travels as desired, it is necessary to set a trigger point for performing the gait authentication to the vehicle 30 each time. For this reason, the timing for setting (determining) the trigger point at which the gait authentication is performed is important. In the present embodiment, as illustrated in FIG. 6, as the setting timing of the trigger point, the trigger point can be set at timings (1) to (5) at which the vehicle 30 stops. That is, conceivable as the setting timing are: (1) When doors are locked from the outside; (2) When a door is opened, and a user goes outside; (3) When the vehicle stops; (4) When parking of the vehicle is completed; and (5) When the autonomous driving vehicle is called.

By setting the trigger point at the timing indicated by (1) to (5), it is possible to set an appropriate trigger point for the vehicle 30 that can travel to a desired place and to appropriately execute the gait authentication. The detection of each of the timing indicated in (1) to (5) can be processed by detecting one of events listed in FIG. 6.

<2.5.1. First Specific Example of Trigger Point Determination>

Next, a specific example of determining the trigger point will be described. As described above, the trigger point can be set on the outer edge of a designated area around the vehicle 30 at the timing when the vehicle 30 is parked. In this case, a geofence with a predetermined radius from the vehicle 30 is set, and a place where the user has passed (entered) the geofence can be set as the trigger point. On the other hand, it is also conceivable that passage through the trigger point (entry to the geofence) occurs a plurality of times depending on the walking route in the geofence, and thus, it is not appropriate as the timing of executing the gait authentication and the timing of notifying that the gait authentication has failed in a case where the gait authentication has failed. Furthermore, depending on the walking route in the geofence, it is conceivable that it takes an excessively long time to arrive at the vehicle 30 after passing the trigger point, and thus the user experience may be impaired.

Therefore, in the present first specific example, the trigger point is set at a position where the traveling time until the user arrives at the vehicle 30 equals a predetermined period of time t. The predetermined period of time t can be set as appropriate, however, it is preferable to set to about 1 to 2 minutes, for example. FIG. 7 is a flowchart illustrating an operation procedure for setting the trigger point. As illustrated in FIG. 7, the trigger point calculating unit 210 extracts walking sections of the user in the past few days from the action history recording unit 216 (step S51). In this extraction, walking sections and walking times of the user can be extracted from the walking history using the acceleration sensor.

Next, the trigger point calculating unit 210 calculates an average walking speed (average traveling speed) from the traveling distance and the walking time in the walking section (step S52). In this configuration, a recent average walking speed of the user can be obtained. In addition, the trigger point calculating unit 210 acquires map information around a place where the vehicle 30 is parked from the map information DB 212 (step S53) and estimates a possible route on foot from the current position of the user to the vehicle 30 (step S54). In this case, the Dijkstra's algorithm or the A* algorithm can be used for the shortest route search through which the user may pass.

Next, a time required for the user in a case where the user passes through each estimated route is calculated from the route length and the average walking speed (step S55). Finally, the trigger point is set at a position where the traveling time to the vehicle 30 equals the predetermined period of time t (step S56). According to this configuration, since the trigger point is set on the basis of the time required for walking to the vehicle 30, it is possible to avoid a situation in which the trigger point is passed a plurality of times. In addition, since the traveling time from the passage through the trigger point to the arrival at the vehicle 30 can be set to be substantially the same, it is possible to prevent impairment of the user experience regardless of the success or failure of the gait authentication.

<2.5.2. Second Specific Example of Trigger Point Determination>

In first specific example described above, the trigger point is set at the position where the traveling time to the vehicle 30 equals the predetermined period of time t, however, the predetermined period of time t may be adjusted. In the present second specific example, the predetermined period of time t is adjusted depending on the place where the user holds the information processing terminal 10 or the type of the information processing terminal 10 in consideration of notifying the user in a case where the gait authentication at the trigger point fails.

FIG. 8 is a table illustrating specific examples of the type of information processing terminal and the predetermined period of time t to be set. As illustrated in FIG. 8, for example, in a case where a smartphone as the information processing terminal 10 is in a pocket, the user notices the notification by sound or vibration, and thus the trigger point calculating unit 210 can set the predetermined period of time t to a reference value (default). On the other hand, in a case where the smartphone is in a bag, since the user is less likely to notice the notification than in the pocket, the trigger point calculating unit 210 sets the predetermined period of time t to be longer than the reference value. With this configuration, since the notification can be made at a position farther from the vehicle 30 than in the case of the reference value, even if the user notices the notification with a delay, it is possible to secure a time for taking out the smartphone from the bag and performing the alternative authentication.

Furthermore, in a case where a watch/wristband-type wearable device is worn on the arm as the information processing terminal 10, the user easily notices the notification, and further, operability is high. Therefore, the trigger point calculating unit 210 can set the predetermined period of time t to be shorter than the reference value.

Furthermore, in a case where an AR glass/bearable wearable device is worn as the information processing terminal 10, the user instantly notices the notification, whereas information notified at the same time as reception of the notification is displayed on a glass monitor, or voice is output through earphones. For this reason, the user's vision or hearing may be partially deprived instantaneously by loading of the above information. Therefore, in this type of wearable device, the trigger point calculating unit 210 sets the predetermined period of time t to the reference value. Furthermore, after the user passes through the trigger point, the user is notified of the failure of the gait authentication at the timing when the user stops. With this configuration, it is possible to prevent an abrupt notification to the user during walking.

<2.5.3. Third Specific Example of Trigger Point Determination>

In addition, in the present third specific example, the predetermined period of time t is adjusted depending on at least one of the road surface condition of the route to the vehicle 30, the geographical condition around the vehicle 30, or the weather condition when the user walks. FIG. 9 is a table illustrating specific examples of geographical or weather conditions and the predetermined period of time t to be set. In a place where a flat straight road continues as a route to the vehicle 30, the gait authentication tends to be successful, and thus the trigger point calculating unit 210 can set the predetermined period of time t to be shorter than the reference value. In this configuration, the possibility of notifying the user of the failure of the gait authentication is low, and impairment of the user experience can be avoided even if the predetermined period of time t is set to be shorter than the reference value.

On the other hand, in a place where there are many corners and a short straight line as a route to the vehicle 30, the way of walking of the user changes from usual, and thus, the gait authentication tends to fail. Therefore, the trigger point calculating unit 210 sets the predetermined period of time t to be longer than the reference value. With this configuration, since the notification to the user can be made at a position farther from the vehicle 30 than in the case of the reference value, even if the user notices the notification with a delay, it is possible to secure a time for performing the alternative authentication.

In addition, under a weather condition where it is raining or snowing, the way of walking of the user changes from usual by holding an umbrella, and thus, the gait authentication tends to fail. Therefore, the trigger point calculating unit 210 sets the predetermined period of time t to be longer than the reference value. With this configuration, since the notification can be made at a position farther from the vehicle 30 than in the case of the reference value, even if the user notices the notification with a delay while holding the umbrella, it is possible to secure a time for performing the alternative authentication.

In addition, on a road with large unevenness such as a gravel road, the road surface condition of the route to the vehicle 30 greatly affects the way of walking, and the way of walking of the user greatly differs from usual, and thus the gait authentication tends to fail in most cases. For this reason, accurate authentication is difficult when the gait authentication is performed on such a road, and thus the trigger point calculating unit 210 resets the trigger point to a flat straight road on a nearby route. In this case, priority is given to setting on a flat road, and the predetermined period of time t may be shorter than the reference value. With this configuration, it is possible to improve the probability of succeeding in the gait authentication, and eventually, it is possible to improve the user experience.

<2.6.1. First Specific Example of Determination of Gait Authentication Threshold Value>

Next, a specific example of determination of the gait authentication threshold value will be described. As described above, in the gait authentication, the success or failure of authentication is determined after the gait authentication threshold value is determined. In a case where a traveling body such as the vehicle 30 is the control target, the level of risk related to the vehicle 30 varies depending on the surrounding environment of the place where the vehicle 30 is parked. Therefore, the gait authentication threshold value determining unit 218 sets the gait authentication threshold value as the reference value and adjusts the gait authentication threshold value higher or lower with respect to the reference value depending on the surrounding environment of the vehicle 30, the user's habitual action, and the like. In this description, setting the gait authentication threshold value to be smaller than the reference value is referred to as raising the acceptance rate, and setting the gait authentication threshold value to be larger than the reference value is referred to as lowering the acceptance rate.

For example, in a case where the user has traveled from a habitual place at a habitual time, the gait authentication threshold value determining unit 218 sets the gait authentication threshold value to be smaller than the reference value to raise the acceptance rate. When the acceptance rate is raised, not only the user himself/herself but also other people are easily accepted, and thus safety is deteriorated. However, in order for another person to spoof the user, a hurdle of imitating the habit of the user is imposed, and thus, it is possible to raise the acceptance rate and to reduce erroneous failure of authentication of the user himself/herself. As for the habit of the user, the information stored in the action history recording unit 216 can be referred to.

In addition, for example, in a case where the vehicle is parked in a parking lot that requires another authentication means to enter the facility such as a case of an apartment, the gait authentication threshold value determining unit 218 sets the gait authentication threshold value to be smaller than the reference value to raise the acceptance rate. In order for another person to spoof the user, it is necessary to pass the dual security (authentication), and thus it is possible to raise the acceptance rate.

Furthermore, for example, in a case where the vehicle is parked in a parking lot of a commercial facility having a small site area such as a convenience store, if the user has not gone out of the site of the facility within a certain period of time, the gait authentication threshold value determining unit 218 sets the gait authentication threshold value to be smaller than the reference value and raises the acceptance rate. In a commercial facility having a small site area, since the walking distance is short, the gait authentication is likely to fail even for the user himself/herself. Therefore, it is effective to raise the acceptance rate to deal with use cases where the vehicle is parked for a short time.

In addition, in a case where the user returns together with a fellow passenger at the time of alighting the vehicle, the gait authentication threshold value determining unit 218 sets the gait authentication threshold value to be smaller than the reference value to raise the acceptance rate. In this case, the information processing terminal 10 of the user and an information processing terminal of the fellow passenger can perform proximity determination using Bluetooth/BLE or position information. In this example, in order for another person to spoof the user, it is necessary to spoof the fellow passenger at the same time, and thus the acceptance rate can be raised.

In addition, in a case where the user has parked the vehicle in an open air parking lot and has been away from the vehicle 30 for a long time, the gait authentication threshold value determining unit 218 sets the gait authentication threshold value to be larger than the reference value and lowers the acceptance rate. In this case, even if the vehicle 30 as a target is unknown, it is conceivable that the vehicle 30 as a target is identified by walking beside a group of vehicles parked. Therefore, spoofing by another person can be suppressed by lowering the acceptance rate.

In a case where the vehicle 30 is parked in a place where many people pass (come and go) on foot, the gait authentication threshold value determining unit 218 sets the gait authentication threshold value to be larger than the reference value and lowers the acceptance rate. In a place where an unspecified number of people pass by, the risk of theft of the vehicle 30 is high. Therefore, it is possible to suppress spoofing by another person by lowering the acceptance rate.

In a case where a detection list of a wireless communication device (for example, a BLE compatible device) carried at the time of alighting the vehicle and a detection list of a BLE compatible device carried at the time of returning to the vehicle 30 are different, the gait authentication threshold value determining unit 218 sets the gait authentication threshold value to be larger than the reference value and lowers the acceptance rate. Normally, the user's belongings do not change substantially in a short time, and thus there is a high possibility that the user is another person. In this case, spoofing by another person can be suppressed by lowering the acceptance rate.

The gait authentication threshold value determining unit 218 can also lower the acceptance rate by setting the gait authentication threshold value to be larger than the reference value depending on the elapsed time after alighting the vehicle 30. The longer an active time away from the vehicle 30 is, the higher the risk of losing the information processing terminal 10, for example. Therefore, it is possible to effectively suppress the spoofing by another person by gradually increasing the gait authentication threshold value depending on the elapsed time and lowering the acceptance rate.

In addition, in a case where the vehicle 30 is parked in a parking lot at home, the gait authentication threshold value determining unit 218 may extremely decrease the gait authentication threshold value to be smaller than the reference value to raise the acceptance rate to the maximum. In a case where the distance from the entrance of the house to the parking lot is short, there is a possibility that the gait authentication fails. Therefore, it is preferable to reduce the gait authentication threshold value to raise the acceptance rate. In this case, for example, the gait authentication threshold value may be adjusted so that the above-described false rejection rate (FRR) equals 0%, or the gait authentication may not be executed. Furthermore, the gait authentication can be performed indoors at home. In this case, it is not necessary to extremely reduce the gait authentication threshold value.

<2.6.2. Second Specific Example of Determination of Gait Authentication Threshold Value>

In the present second specific example, the gait authentication threshold value is adjusted depending on at least one of the road surface condition of the route to the vehicle 30, the geographical condition around the vehicle 30, or the weather condition when the user walks. FIG. 10 is a table illustrating specific examples of geographical or weather conditions and the acceptance rate. In a place where a flat straight road continues as a route to the vehicle 30, the gait authentication tends to be successful, and thus the gait authentication threshold value determining unit 218 can lower the acceptance rate by increasing the gait authentication threshold value to be larger than the reference value.

On the other hand, in a place where there are many corners and a short straight line as a route to the vehicle 30, the way of walking changes from usual, and thus, the gait authentication tends to fail. For this reason, the gait authentication threshold value determining unit 218 sets the gait authentication threshold value to be smaller than the reference value to raise the acceptance rate. With this configuration, as compared with the case of the reference value, it is possible to reduce the failure of the gait authentication and to improve the user experience.

In addition, under a weather condition where it is raining or snowing, the way of walking changes from usual by holding an umbrella, and thus, the gait authentication tends to fail. For this reason, the gait authentication threshold value determining unit 218 sets the gait authentication threshold value to be smaller than the reference value to raise the acceptance rate. With this configuration, as compared with the case of the reference value, it is possible to reduce the failure of the gait authentication and to improve the user experience.

In addition, on a road with large unevenness such as a gravel road, the road surface condition of the route to the vehicle 30 greatly affects the way of walking, and the way of walking greatly differs from usual, and thus the gait authentication tends to fails in most cases. For this reason, accurate authentication is difficult when the gait authentication is performed on such a road, and thus it is preferable that the gait authentication threshold value determining unit 218 sets the gait authentication threshold value to be extremely smaller than the reference value to raise the acceptance rate.

<2.6.3. Third Specific Example of Determination of Gait Authentication Threshold Value>

In the second specific example described above, the gait authentication threshold value (acceptance rate) is adjusted by referring to the geographical conditions around the vehicle 30, however, in the present third specific example, whether or not the place (route) is suitable for the gait authentication can be determined, or the gait authentication threshold value (acceptance rate) can be adjusted, from the tendency of the success or failure of the gait authentication of other users (or gait authentication scores) without referring to these geographical conditions.

Specifically, the information processing server 20 accumulates authentication success data in which a road (route) on which the gait authentication has been executed is associated with success or failure of the gait authentication including those of other users. In this case, the success of the gait authentication means that the gait authentication score (output within a range of 0.0 to 1.0) calculated at the time of the gait authentication is greater than or equal to a predetermined value (0.99). Furthermore, the information processing server 20 may refer to the authentication success data from another information processing server or the like via the network 40. On the basis of past authentication success data, the information processing server 20 obtains the success rate of the gait authentication on a road on which the user is likely to walk and determines that the higher the success rate is, the more suitable the road is for the gait authentication. For example, in a case where the success rate for a road A is 98%, the success rate for a road B is 75%, and the success rate for a road C is 95%, the information processing server 20 determines that the road A is the most suitable road for the gait authentication and that the road B is the most unsuitable road for the gait authentication. In addition, the gait authentication threshold value determining unit 218 adjusts the gait authentication threshold value such that the acceptance rate of the gait authentication satisfies this order: road A<road C<road B. That is, the gait authentication threshold value determining unit 218 can set the gait authentication threshold value to be smaller and raise the acceptance rate as the success rate of the gait authentication is lower. In this configuration, the gait authentication threshold value determining unit 218 adjusts the gait authentication threshold value depending on the place where the gait authentication is executed and the past success rate of the gait authentication at that place, and thus the gait authentication threshold value can be easily adjusted, and the success rate of the gait authentication is increased. As a result, the user experience can be improved.

<2.6.4. Fourth Specific Example of Determination of Gait Authentication Threshold Value>

In the present fourth specific example, in a case where the gait authentication fails, the gait authentication threshold value determining unit 218 outputs a user interface related to changing the gait authentication threshold value and adjusts the gait authentication threshold value so that the acceptance rate is increased (a failure of the continuous authentication is avoided) on the basis of an instruction of the user input in the user interface. FIG. 11 is a diagram illustrating an example of a series of user interfaces related to modification of a gait authentication threshold value displayed on an information processing terminal. In FIG. 11, a watch-type wearable device is illustrated as the information processing terminal 10, however, it is not limited thereto.

When the gait authentication fails several times, as illustrated in the left diagram of FIG. 11, a fact 150 that the gait authentication has failed and a prompt (user interface) including an input screen 151 prompting input of an alternative authentication means are displayed on a display device 134A. Illustrated in FIG. 11 is a case where a PIN is used as the alternative authentication means. This PIN is a password that only the user knows. When a predetermined PIN is input on the input screen 151, as illustrated in the middle diagram of FIG. 11, a prompt (user interface) including an input screen 152 inquiring whether or not to change the settings to facilitate the success of the gait authentication is displayed on the display device 134A. Here, on the input screen 152, in a case where the user agrees (selects Yes) to change the settings, the gait authentication threshold value determining unit 218 sets the gait authentication threshold value to be small and raises the acceptance rate. Then, as illustrated in the right diagram of FIG. 11, a user interface including a screen 153 indicating that the settings have been changed is displayed on the display device 134A.

In this configuration, on the basis of the input operation (instruction) of the user to the prompt (user interface) displayed on the display device 134A, the gait authentication threshold value determining unit 218 sets the gait authentication threshold value to be small to raise the acceptance rate, and thus the gait authentication is facilitated to succeed, and as a result, the user experience can be improved. Note that, in the state illustrated in the middle diagram of FIG. 11, in a case where the user does not agree to change the settings (selects No), the processing is terminated.

<2.7.1. First Specific Example of Determination of Alternative Authentication Means>

Next, a specific example of selecting and determining an alternative authentication means will be described. As described above, alternative authentication is for authenticating whether or not the user is the person himself/herself in place of the gait authentication when the gait authentication fails and is performed by using at least one alternative authentication means selected from a plurality of alternative authentication means. As the alternative authentication means, one or a combination of some is selected from among a biometric authentication means, a knowledge authentication means, and a belongings authentication means.

FIG. 12 is a table illustrating specific examples of alternative authentication means classified depending on a difference value between a gait authentication score and the gait authentication threshold value. In the first specific example, the alternative authentication means selecting unit 124 automatically selects and determines the alternative authentication means depending on a difference value between a gait authentication score calculated at the time of the gait authentication and a determined gait authentication threshold value. In this example, the alternative authentication means selecting unit 124 selects an alternative authentication means having lower authentication assurance as the difference value is smaller and selects an alternative authentication means having higher authentication assurance as the difference value is larger. According to this configuration, in a case where it is authenticated that the difference value is small, that is, in a case where it is authenticated that the person is close to the user himself/herself, an alternative authentication means focusing on a lower operation or workload for the user rather than the authentication assurance is selected, and thus the convenience can be improved. In addition, in a case where the difference value is large, that is, in a case where it is authenticated that the person is far from the user, the alternative authentication means having higher authentication assurance is selected, and thus it is possible to prevent another person from spoofing the user to perform the alternative authentication.

In addition, in the first specific example, the alternative authentication means selecting unit 124 selects an alternative authentication means of which authentication operation is easy as the difference value is smaller and selects an alternative authentication means of which authentication operation is complicated as the difference value increases.

Specifically, in a case where the difference value is small (for example, less than 0.05), the alternative authentication means selecting unit 124 selects and determines rhythm authentication as the alternative authentication means. The rhythm authentication is to tap the information processing terminal 10 in the same manner as registered rhythm and is included in knowledge authentication in a broad sense. In this rhythm authentication, although the authentication assurance is low because another person can easily imitate, there is also an advantage that it can be easily performed.

Specifically, in a case where the difference value is medium (for example, greater than or equal to 0.05 and less than 0.2), the alternative authentication means selecting unit 124 selects and determines driver's license touch authentication as the alternative authentication means. The driver's license touch authentication is one of so-called belongings authentication and determines whether or not information stored in the user's driver's license matches information of the registered user. Furthermore, in a case where the difference value is medium, a configuration may be adopted in which a screen lock of the information processing terminal 10 is unlocked by inputting a password (knowledge authentication) and the application is opened from notification.

In addition, in a case where the difference value is large (for example, greater than or equal to 0.2 and less than 0.95), the alternative authentication means selecting unit 124 selects and determines two of the above driver's license touch authentication and biometric authentication such as fingerprint authentication as the alternative authentication means. In this configuration, since the two-factor alternative authentication means is selected, the authentication assurance is high, and it is possible to effectively prevent spoofing by another person. Note that, in a case where the difference value is large, for example, two types of biometric authentication such as fingerprint authentication and face authentication may be combined.

In addition, in a case where the difference value is extremely large (for example, greater than or equal to 0.95), the alternative authentication means selecting unit 124 selects and determines all the three factors of the knowledge authentication, the biometric authentication, and the belongings authentication. In this case, strong personal authentication of the user can be implemented.

<2.7.2. Second Specific Example of Determination of Alternative Authentication Means>

In first specific example, the alternative authentication means selecting unit 124 automatically selects the alternative authentication means depending on the magnitude of the difference value, however, the alternative authentication means selecting unit 124 may select an alternative authentication means of the user's choice. FIG. 13 is an example of a series of user interfaces related to selection of an alternative authentication means displayed on the information processing terminal.

When the gait authentication fails, as illustrated in the left diagram of FIG. 13, a fact 160 that the gait authentication has failed and a prompt (user interface) including an input screen 161 prompting to select a predetermined number of alternative authentication means from a plurality of alternative authentication means are displayed on the display device 134A. The number of alternative authentication means to be selected may be defined in advance or may be changed depending on the magnitude of the difference value described above. When the user selects the fingerprint and the driver's license on the input screen 161, the alternative authentication means selecting unit 124 selects alternative authentication means by the fingerprint and the driver's license that have been selected. Then, as illustrated in the middle diagram of FIG. 13, a user interface having a fingerprint reading screen 162 is displayed on the display device 134A. The user performs fingerprint authentication by placing a user's finger 164 at a predetermined position on the fingerprint reading screen 162. When the fingerprint authentication succeeds, as illustrated in the right diagram of FIG. 13, a user interface having a driver's license reading screen 163 is displayed on the display device 134A. The user places his/her driver's license 165 at a predetermined position on the driver's license reading screen 163 to perform driver's license touch authentication.

In this configuration, the alternative authentication means selecting unit 124 selects the alternative authentication means on the basis of the input operation (instruction) by the user in the user interface displayed on the display device 134A, and thus the user can consciously select the alternative authentication means at the time of the alternative authentication. Therefore, it is also possible to select an alternative authentication means that facilitates alternative authentication, and thus it is possible to improve the convenience at the time of the alternative authentication.

<2.7.3. Third Specific Example of Determination of Alternative Authentication Means>

As described above, in the gait authentication, the gait authentication score is compared with the gait authentication threshold value. In a case where the gait authentication score exceeds (is larger than) the gait authentication threshold value, it is determined that the gait authentication has succeeded. In a case where the gait authentication score does not exceed (is less than or equal to) the gait authentication threshold value, it is determined that the gait authentication has failed. For this reason, even in a case where the gait authentication has failed, in a case where the difference value between the gait authentication score and the gait authentication threshold value is less than a predetermined value (for example, less than 0.05), it is also effective to perform the gait authentication one more time. Therefore, in the third specific example, the alternative authentication means selecting unit 124 selects redoing of the gait authentication as the alternative authentication means on the basis of the user's instruction regarding the redoing of the gait authentication. FIG. 14 is an example of a series of user interfaces related to redoing of the gait authentication displayed on the information processing terminal.

In a case where the gait authentication fails and the difference value is less than the predetermined value (for example, less than 0.05), as illustrated in the left diagram of FIG. 14, a fact 171 that the gait authentication has failed and a prompt (user interface) including an input screen 172 inquiring whether or not to perform additional walking for a predetermined period of time (for example, 30 seconds) is displayed on the display device 134A. On this input screen 172, in a case of not agreeing to additional walking (No is selected), another alternative authentication selection means can be presented.

On the other hand, in a case of agreeing to the additional walking (Yes is selected) on the input screen 172, the alternative authentication means selecting unit 124 selects to redo the gait authentication as the alternative authentication means. In this case, as illustrated in the right diagram of FIG. 14, a guidance screen 174 indicating a route 173 for walking to the vehicle 30 over a predetermined period of time is displayed on the display device 134A by referring to map information of the surroundings.

With this configuration, in a case where the difference value between the gait authentication score and the gait authentication threshold value is less than the predetermined value, the alternative authentication means selecting unit selects redoing of the gait authentication as the alternative authentication means on the basis of the instruction of the user, and thus it is possible to perform the alternative authentication with a simple configuration. Furthermore, in a case of redoing the gait authentication, a walking route is displayed, and thus the user is only required to walk along the walking route, and the alternative authentication can be further easily performed.

<2.8. Specific Example of Notification of Failure of Gait Authentication and Alternative Authentication Means>

In the configuration described above, in a case where the gait authentication has failed, the fact that the gait authentication has failed and the notification related to selection of the alternative authentication means are displayed on the display device 134A included in the information presentation unit 134 of the information processing terminal 10, however, it is not limited thereto. For example, in a case where a display device, such as a digital signage (electronic signage), is located on a route on which the user walks towards the vehicle 30, it is possible to display the notification regarding the fact that the gait authentication has failed and the selection of the alternative authentication means on the digital signage. In this case, the information processing terminal 10 may directly or indirectly transmit the information to the digital signage through the network 40 to display the notification and others.

Furthermore, in a case where the vehicle 30 includes a projector device from the first place, the information processing terminal 10 may directly or indirectly transmit the information to the vehicle 30 through the network 40 to display the notification regarding the fact that the gait authentication has failed and the selection of the alternative authentication means on the body of the vehicle 30 or a road surface where the vehicle 30 is parked.

3. Hardware Configuration Example

Figure 15:
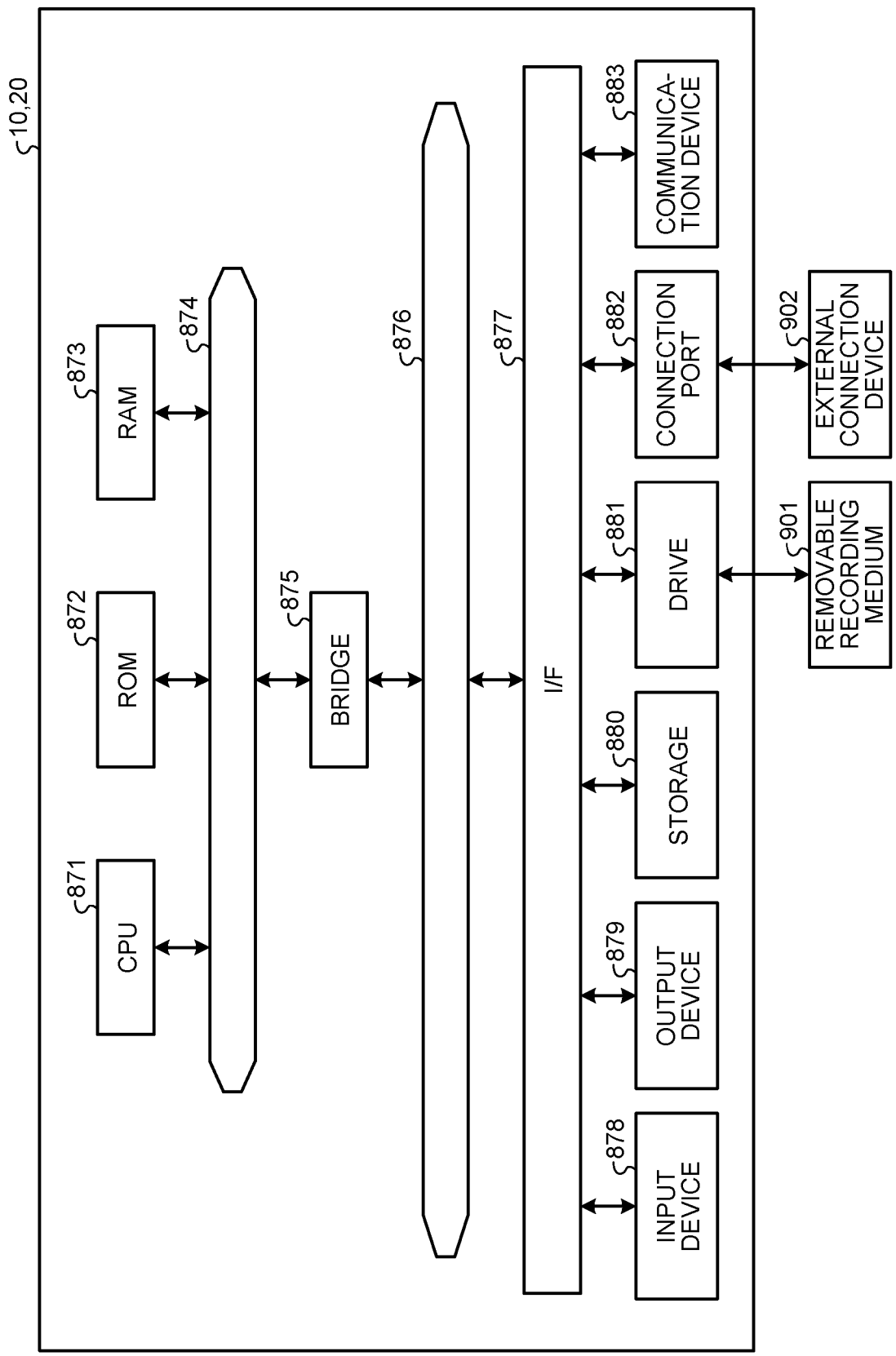
FIG. 15 is a block diagram illustrating a hardware configuration example of the information processing terminal and an information processing server according to the present disclosure.

Next, a hardware configuration example shared by the information processing terminal 10 and the information processing server 20 according to the present disclosure will be described. FIG. 15 is a block diagram illustrating a hardware configuration example of the information processing terminal 10 and the information processing server 20 according to the present disclosure. Referring to FIG. 15, the information processing terminal 10 and the information processing server 20 according to the present disclosure each include, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. In addition, components other than the components illustrated here may be further included.

The CPU 871 functions as, for example, an arithmetic processing device or a control device and controls the overall operation or a part the components on the basis of various programs recorded in the ROM 872, the RAM 873, the storage 880, or a removable recording medium 901.

The ROM 872 is a means that stores a program read by the CPU 871, data used for arithmetic calculation, and others. The RAM 873 temporarily or permanently stores, for example, a program read by the CPU 871, various parameters that change as required when the program is executed, and others.

The CPU 871, the ROM 872, and the RAM 873 are mutually connected via, for example, the host bus 874 capable of high-speed data transmission. Meanwhile, the host bus 874 is connected to the external bus 876 having a relatively low data transmission speed via the bridge 875, for example. The external bus 876 is further connected to various components via the interface 877.

As the input device 878, for example, a mouse, a keyboard, a touch panel, a button, a switch, a lever, and the like are used. Furthermore, as the input device 878, a remote controller capable of transmitting a control signal using infrared rays or other radio waves may be used. Furthermore, the input device 878 includes an audio input device such as a microphone.

The output device 879 is a device capable of visually or audibly notifying the user of acquired information, such as a display device such as a cathode ray tube (CRT), an LCD, or an organic EL, an audio output device such as a speaker or a headphone, a printer, a mobile phone, or a facsimile.

The storage 880 is a device for storing various types of data. As the storage 880, for example, a magnetic storage device such as a hard disk drive (HDD), a semiconductor storage device, an optical storage device, a magneto-optical storage device, or the like is used.

The drive 881 is, for example, a device that reads information recorded on the removable recording medium 901 such as a magnetic disk, an optical disk, a magneto-optical disk, or a semiconductor memory or writes information to the removable recording medium 901.

The removable recording medium 901 is, for example, a DVD media, a Blu-ray (registered trademark) media, an HD DVD media, various semiconductor storage media, or the like. Of course, the removable recording medium 901 may be, for example, an IC card on which a contactless IC chip is mounted, an electronic device, or the like.

The connection port 882 is a port for connecting an external connection device 902 such as a universal serial bus (USB) port, an IEEE 1394 port, a small computer system interface (SCSI), an RS-232C port, or an optical audio terminal.

The external connection device 902 is, for example, a printer, a portable music player, a digital camera, a digital video camera, an IC recorder, or the like.

The communication device 883 is a communication device for connecting to a network, and is, for example, a communication card for wired or wireless LAN, Bluetooth, or wireless USB (WUSB), a router for optical communication, a router for asymmetric digital subscriber line (ADSL), a modem for various types of communications, or the like.

4. Summary

As described above, the information processing terminal 10 according to the present disclosure performs the gait authentication of the user when the user passes through the trigger point set at timing before a point for unlocking the doors and notifies the user that the gait authentication has failed in a case where the gait authentication has failed. Therefore, it is possible to prevent the user from noticing the failure of the gait authentication only when a door of the vehicle 30 is opened, and it is possible to prevent impairment of the user experience.

Although the preferred embodiments of the present disclosure have been described in detail by referring to the accompanying drawings, the technical scope of the present disclosure is not limited to such examples. It is obvious that a person having ordinary knowledge in the technical field of the present disclosure can conceive various modifications or variations within the scope of the technical idea described in the claims, and it is naturally understood that these also belong to the technical scope of the present disclosure.

Furthermore, the effects described in the present specification are merely illustrative or exemplary and are not limiting. That is, the technology according to the present disclosure can achieve other effects that are obvious to those skilled in the art from the description of the present specification together with or in place of the above effects.

Meanwhile, the steps according to the processing of the information processing terminal 10, the information processing server 20, and the vehicle 30 in the present specification are not necessarily processed in time series in the order described in the flowcharts. For example, the steps according to the processing of the information processing terminal 10, the information processing server 20, and the vehicle 30 may be processed in an order different from the order described in the flowcharts or may be processed in parallel.

Note that the following configurations also belong to the technical scope of the present disclosure.

(1)

An information processing device comprising:
a trigger point acquiring unit that acquires a trigger point at which continuous authentication of a user is performed, the trigger point passed through before a point at which predetermined operation on a control target is performed;
a continuous authentication unit that performs the continuous authentication on a basis of motion information obtained by continuously measuring a motion of the user when the trigger point is passed; and
a notification unit that notifies the user that the continuous authentication has failed in a case where the continuous authentication has failed.

(2)

The information processing device according to (1), further comprising:
an alternative authentication means selecting unit that selects an alternative authentication means in a case where the continuous authentication fails; and
an alternative authentication unit that performs alternative authentication for the predetermined operation by using the alternative authentication means that has been selected.

(3)

The information processing device according to (2), wherein the alternative authentication means selecting unit selects the alternative authentication means depending on a difference value between a score indicating authenticity of the user calculated at a time of the continuous authentication and a continuous authentication threshold value that has been set.

(4)

The information processing device according to (2) or (3), wherein the alternative authentication means selecting unit outputs a user interface related to a plurality of the alternative authentication means and selects at least one alternative authentication means on a basis of an instruction of the user input in the user interface.

(5)

The information processing device according to (2) or (3), wherein the alternative authentication means selecting unit outputs a user interface related to redoing of the continuous authentication and, in a case where a difference value between a score indicating authenticity of the user calculated at a time of the continuous authentication and a continuous authentication threshold value that has been set is less than a predetermined value, selects redoing of the continuous authentication as the alternative authentication means on a basis of an instruction of the user input in the user interface.

(6)

The information processing device according to any one of (2) to (5), wherein the alternative authentication means selecting unit selects, as the alternative authentication means, at least one of a biometric authentication means, a knowledge authentication means, or a belongings authentication means.

(7)

The information processing device according to any one of (3) to (6), wherein the alternative authentication means selecting unit selects the alternative authentication means having higher authentication assurance as the difference value is larger.

(8)

The information processing device according to any one of (1) to (7), further comprising
a trigger point setting unit that sets the trigger point, wherein the trigger point setting unit sets the trigger point at a position where a traveling time until the user arrives at the control target equals a predetermined period of time.

(9)

The information processing device according to (8), wherein the trigger point setting unit sets the predetermined period of time on a basis of a length of a path to the control target and an average traveling speed of the user.

(10)

The information processing device according to (8) or (9), wherein the trigger point setting unit adjusts the predetermined period of time depending on a place where the user is carrying the information processing device or a type of the information processing device.

(11)

The information processing device according to any one of (8) to (10), wherein the trigger point setting unit adjusts the predetermined period of time depending on at least one of a road surface condition of a route to the control target, a geographical condition around the control target, or a weather condition when the user travels.

(12)

The information processing device according to any one of (1) to (11), wherein the continuous authentication unit calculates a score indicating authenticity of the user on a basis of the motion information and, in a case where the score is less than or equal to a continuous authentication threshold value that has been set, determines that the continuous authentication has failed.

(13)

The information processing device according to (12), further comprising
a continuous authentication threshold value setting unit that sets the continuous authentication threshold value, wherein the continuous authentication threshold value setting unit adjusts the continuous authentication threshold value depending on a surrounding environment of the control target.

(14)

The information processing device according to (12) or (13), further comprising
a continuous authentication threshold value setting unit that sets the continuous authentication threshold value, wherein the continuous authentication threshold value setting unit outputs a user interface related to changing the continuous authentication threshold value in a case where the continuous authentication fails and changes the continuous authentication threshold value so that a failure of the continuous authentication is avoided on a basis of an instruction of the user input in the user interface.

(15)

The information processing device according to any one of (1) to (14), wherein the control target is a self-propelled traveling body.

(16)

The information processing device according to any one of (1) to (15), wherein the continuous authentication unit executes gait authentication based on walking information of the user.

(17)

An information processing method comprising the steps of:
by a processor,
acquiring a trigger point at which continuous authentication of a user is performed, the trigger point passed through before a point at which predetermined operation on a control target is performed;
performing the continuous authentication on a basis of motion information obtained by continuously measuring a motion of the user when the trigger point is passed; and
notifying the user that the continuous authentication has failed in a case where the continuous authentication has failed.

(18)

An information processing program for causing a computer to function as an information processing device comprising:
a trigger point acquiring unit that acquires a trigger point at which continuous authentication of a user is performed, the trigger point passed through before a point at which predetermined operation on a control target is performed;
a continuous authentication unit that performs the continuous authentication on a basis of motion information obtained by continuously measuring a motion of the user when the trigger point is passed; and
a notification unit that notifies the user that the continuous authentication has failed in a case where the continuous authentication has failed.

(19)

An information processing system comprising:
an information processing terminal and an information processing server,
wherein the information processing terminal comprises:
a trigger point acquiring unit that acquires a trigger point at which continuous authentication of a user is performed, the trigger point passed through before a point at which predetermined operation on a control target is performed;
a continuous authentication unit that performs the continuous authentication on a basis of motion information obtained by continuously measuring a motion of the user when the trigger point is passed; and
a notification unit that notifies the user that the continuous authentication has failed in a case where the continuous authentication has failed, and
the information processing server comprises a trigger point setting unit that sets the trigger point.

REFERENCE SIGNS LIST

1 INFORMATION PROCESSING SYSTEM
10 INFORMATION PROCESSING TERMINAL (INFORMATION PROCESSING DEVICE)
20 INFORMATION PROCESSING SERVER (INFORMATION PROCESSING DEVICE)
30 VEHICLE (CONTROL TARGET, TRAVELING BODY)
118 TRIGGER POINT RECORDING UNIT (TRIGGER POINT ACQUIRING UNIT)
120 GAIT AUTHENTICATION SCORE CALCULATING UNIT
122 GAIT AUTHENTICATION THRESHOLD VALUE RECORDING UNIT
124 ALTERNATIVE AUTHENTICATION MEANS SELECTING UNIT
128 ALTERNATIVE AUTHENTICATION MEANS INPUT UNIT
130 AUTHENTICATION STATE DETERMINING UNIT
134 INFORMATION PRESENTATION UNIT (NOTIFICATION UNIT)
140 GAIT AUTHENTICATION UNIT (CONTINUOUS AUTHENTICATION UNIT)
142 ALTERNATIVE AUTHENTICATION UNIT
210 TRIGGER POINT CALCULATING UNIT (TRIGGER POINT SETTING UNIT)
218 GAIT AUTHENTICATION THRESHOLD VALUE DETERMINING UNIT (CONTINUOUS AUTHENTICATION THRESHOLD VALUE SETTING UNIT)

The invention claimed is:

1. An information processing device, comprising:
a trigger point acquiring unit configured to acquire a trigger point at which continuous authentication of a user is performed, wherein the trigger point is passed by the user before an operation point at which a specific operation on a control target is performed;
a continuous authentication unit configured to perform the continuous authentication based on motion information and the trigger point being passed by the user, wherein the motion information is obtained by continuous measurement of a motion of the user; and
a notification unit configured to notify the user that the continuous authentication has failed based on a failure of the continuous authentication, wherein the user is notified between the trigger point and the operation point.

2. The information processing device according to claim 1, further comprising:
an alternative authentication selecting unit configured to select an alternative form of authentication from a plurality of alternative forms of authentication based on the failure of the continuous authentication; and
an alternative authentication unit configured to perform alternative authentication for the specific operation by the selected alternative form of authentication.

3. The information processing device according to claim 2, wherein the alternative authentication selecting unit is further configured to select the alternative form of authentication based on a difference value between a score, that indicates authenticity of the user, calculated at a time of the continuous authentication and a set continuous authentication threshold value.

4. The information processing device according to claim 2, wherein the alternative authentication selecting unit is configured to:
output a user interface based on the plurality of alternative forms of authentication; and
select at least one alternative form of authentication based on a user input instruction in the user interface.

5. The information processing device according to claim 2, wherein the alternative authentication selecting unit is configured to:
output a user interface related to repetition of the continuous authentication and,
select, based on a difference value between a score indicates authenticity of the user calculated at a time of the continuous authentication and a continuous authentication threshold value is less than a specific value, repetition of the continuous authentication as the alternative authentication based on a user input instruction in the user interface.

6. The information processing device according to claim 2, wherein the alternative authentication selecting unit is further configured to select, as the alternative form of authentication, at least one of a biometric authentication, a knowledge authentication or a belongings authentication.

7. The information processing device according to claim 3, wherein the alternative authentication selecting unit is further configured to select, based on a large difference value, the alternative form of authentication with higher authentication assurance.

8. The information processing device according to claim 1, further comprising a trigger point setting unit configured to set the trigger point,
wherein the trigger point setting unit is further configured to set the trigger point at a position where a traveling time until the user arrives at the control target equals a specific period of time.

9. The information processing device according to claim 8, wherein the trigger point setting unit is further configured to set the specific period of time based on a length of a path to the control target and an average traveling speed of the user.

10. The information processing device according to claim 8, wherein the trigger point setting unit is configured to adjust the specific period of time based on a place where the user carries the information processing device or a type of the information processing device.

11. The information processing device according to claim 8, wherein the trigger point setting unit is configured to adjust the specific period of time based on at least one of a road surface condition of a route to the control target, a geographical condition around the control target, or a weather condition.

12. The information processing device according to claim 1, wherein the continuous authentication unit is configured to:
calculate, based on the motion information, a score that indicates authenticity of the user; and
determine, based on the score that is less than or equal to a continuous authentication threshold value, the failure of the continuous authentication.

13. The information processing device according to claim 12, further comprising a continuous authentication threshold value setting unit configured to set the continuous authentication threshold value, wherein the continuous authentication threshold value setting unit is configured to adjust the continuous authentication threshold value based on a surrounding environment of the control target.

14. The information processing device according to claim 12, further comprising
a continuous authentication threshold value setting unit configured to set the continuous authentication threshold value,
wherein the continuous authentication threshold value setting unit is configured to:
change, based on the failure of the continuous authentication and a user input instruction in a user interface, the continuous authentication threshold value, and
output the user interface based on the change of the continuous authentication threshold value.

15. The information processing device according to claim 1, wherein the control target is a self-propelled traveling body.

16. The information processing device according to claim 1, wherein the continuous authentication unit is configured to execute gait authentication based on walking information of the user.

17. An information processing method, comprising:
acquiring a trigger point at which continuous authentication of a user is performed, wherein the trigger point is passed by the user before an operation point at which a specific operation on a control target is performed;
performing the continuous authentication based on motion information and the trigger point being passed by the user, wherein the motion information is obtained based on continuous measurement of a motion of the user; and
notifying the user that the continuous authentication has failed based on a failure of the continuous authentication, wherein the user is notified between the trigger point and the operation point.

18. A non-transitory computer-readable medium having stored thereon, computer-executable instructions which, when executed by a processor, cause the processor to execute operations, the operations comprising:
a trigger point acquiring unit configured to acquire a trigger point at which continuous authentication of a user is performed, wherein the trigger point is passed by the user before an operation point at which a specific operation on a control target is performed;
a continuous authentication unit configured to perform the continuous authentication based on motion information and the trigger point being passed by the user, wherein the motion information is obtained by continuous measurement of a motion of the user; and
a notification unit configured to notify the user that the continuous authentication has failed based on a failure of the continuous authentication, wherein the user is notified between the trigger point and the operation point.

19. An information processing system, comprising:
an information processing terminal and an information processing server,
wherein the information processing terminal comprises:
a trigger point acquiring unit configured to acquire a trigger point at which continuous authentication of a user is performed, wherein the trigger point is passed by the user before an operation point at which a specific operation on a control target is performed;
a continuous authentication unit configured to perform the continuous authentication based on motion information and the trigger point being passed by the user, wherein the motion information is obtained by continuous measurement of a motion of the user; and
a notification unit configured to notify the user that the continuous authentication has failed based on a failure of the continuous authentication, and
the information processing server comprises a trigger point setting unit configured to set the trigger point, wherein the user is notified between the trigger point and the operation point.

* * * * *